United States Patent
Kou et al.

(10) Patent No.: US 10,589,426 B2
(45) Date of Patent: Mar. 17, 2020

(54) ROBOT

(71) Applicant: Panasonic Intellectual Property Management Co., Ltd., Osaka (JP)

(72) Inventors: Shiki Kou, Osaka (JP); Ryouta Miyazaki, Osaka (JP); Masahiro Ishii, Hyogo (JP); Kento Ogawa, Osaka (JP); Yuji Kunitake, Kyoto (JP); Seiya Higuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 277 days.

(21) Appl. No.: 15/897,646

(22) Filed: Feb. 15, 2018

(65) Prior Publication Data

US 2018/0169865 A1   Jun. 21, 2018

Related U.S. Application Data

(63) Continuation of application No. PCT/JP2017/019458, filed on May 25, 2017.

(30) Foreign Application Priority Data

May 31, 2016   (JP) ................. 2016-108054

(51) Int. Cl.
*B25J 5/00* (2006.01)
*B25J 9/16* (2006.01)
(Continued)

(52) U.S. Cl.
CPC ........... *B25J 9/1697* (2013.01); *A63H 11/00* (2013.01); *A63H 33/005* (2013.01); *B25J 5/00* (2013.01);
(Continued)

(58) Field of Classification Search
CPC . B25J 9/1697; B25J 5/00; B25J 9/1679; B25J 11/0005; A63H 33/005;
(Continued)

(56) References Cited

U.S. PATENT DOCUMENTS 10,307,911 B2 *  6/2019  Higuchi .............. G05D 1/0231
10,399,616 B2 *  9/2019  Ellerman ............. G05D 1/0891
(Continued)

FOREIGN PATENT DOCUMENTS

CN       103171638      6/2013
JP       2002-116792    4/2002
(Continued)

OTHER PUBLICATIONS

Lim et al., Mechanical design & numerical electromagnetic analysis of a DC spherical actuator, 2004, IEEE, p. 536-541 (Year: 2004).*
(Continued)

*Primary Examiner* — McDieunel Marc
(74) *Attorney, Agent, or Firm* — Greenblum & Bernstein, P.L.C.

(57) ABSTRACT

A robot including a spherical housing made up of a main housing portion, a first spherical cap portion, and a second spherical cap portion. The main housing portion is disposed between the first spherical cap portion and the second spherical cap portion. The robot further including a weight that is provided in the main housing portion and configured to rotate around a pivot that is orthogonal to a shaft connecting the spherical cap portions. When outputting a response to an input instruction received from a user, via an input device, based on a predetermined processing is determined to require a predetermined time or more, a robot controls a first drive mechanism during the predetermined processing such that the first drive mechanism rotates a (Continued)

weight around the pivot to reciprocally move the weight in the opposite directions of the pivot.

10 Claims, 19 Drawing Sheets

(51) Int. Cl.

| | | |
|---|---|---|
| *A63H 11/00* | (2006.01) | |
| *G06K 9/00* | (2006.01) | |
| *H04N 5/225* | (2006.01) | |
| *B25J 11/00* | (2006.01) | |
| *A63H 33/00* | (2006.01) | |
| *G06F 3/16* | (2006.01) | |
| *G06N 3/00* | (2006.01) | |
| *G10L 15/22* | (2006.01) | |
| *H04N 7/18* | (2006.01) | |
| *H04R 1/02* | (2006.01) | |

(52) U.S. Cl.
CPC ......... *B25J 9/1679* (2013.01); *B25J 11/0005* (2013.01); *G06F 3/167* (2013.01); *G06K 9/00664* (2013.01); *G06K 9/00671* (2013.01); *G06N 3/008* (2013.01); *H04N 5/2252* (2013.01); *H04N 5/2257* (2013.01); *A63H 2200/00* (2013.01); *G10L 15/22* (2013.01); *H04N 7/185* (2013.01); *H04R 1/028* (2013.01); *Y10S 901/01* (2013.01); *Y10S 901/46* (2013.01); *Y10S 901/47* (2013.01)

(58) Field of Classification Search
CPC ............. A63H 2200/00; H04N 5/2252; H04N 5/2257; H04N 7/185; G06F 3/167; G06K 9/00664; G06K 9/00671; G06N 3/008; G01L 15/22; Y01S 901/01; Y01S 901/46; Y01S 901/47; G05D 1/0246; G05D 1/0255; G05D 1/08; G05D 39/00; G05D 1/0891
See application file for complete search history.

(56) References Cited

U.S. PATENT DOCUMENTS

| | | |
|---|---|---|
| 2008/0097644 A1 | 4/2008 | Kaznov et al. |
| 2015/0206534 A1 | 7/2015 | Shinkai |
| 2018/0043838 A1* | 2/2018 | Ellerman ............... B62D 39/00 |
| 2019/0061161 A1* | 2/2019 | Higuchi ............... G05D 1/0255 |
| 2019/0094874 A1* | 3/2019 | Ogawa ................ G05D 1/0246 |

FOREIGN PATENT DOCUMENTS

| | | |
|---|---|---|
| JP | 2008-522880 | 7/2008 |
| JP | 2011-227237 | 11/2011 |
| JP | 2015-138147 | 7/2015 |
| WO | 2016/068262 | 5/2016 |

OTHER PUBLICATIONS

Wright et al., A spherical-magnet end-effector for robotic magnetic manipulation, 2015, IEEE, p. 1190-1195 (Year: 2015).*
Ball et al., A practical implementation of a continuous isotropic spherical omnidirectional drive, 2010, IEEE, p. 3775-3780 (Year: 2010).*
Landa et al., Design and start-up of spherical robot with internal pendulum, 2015, IEEE, p. 27-32 (Year: 2015).*
International Search Report of PCT application No. PCT/JP2017/019458 dated Jun. 20, 2017.

* cited by examiner

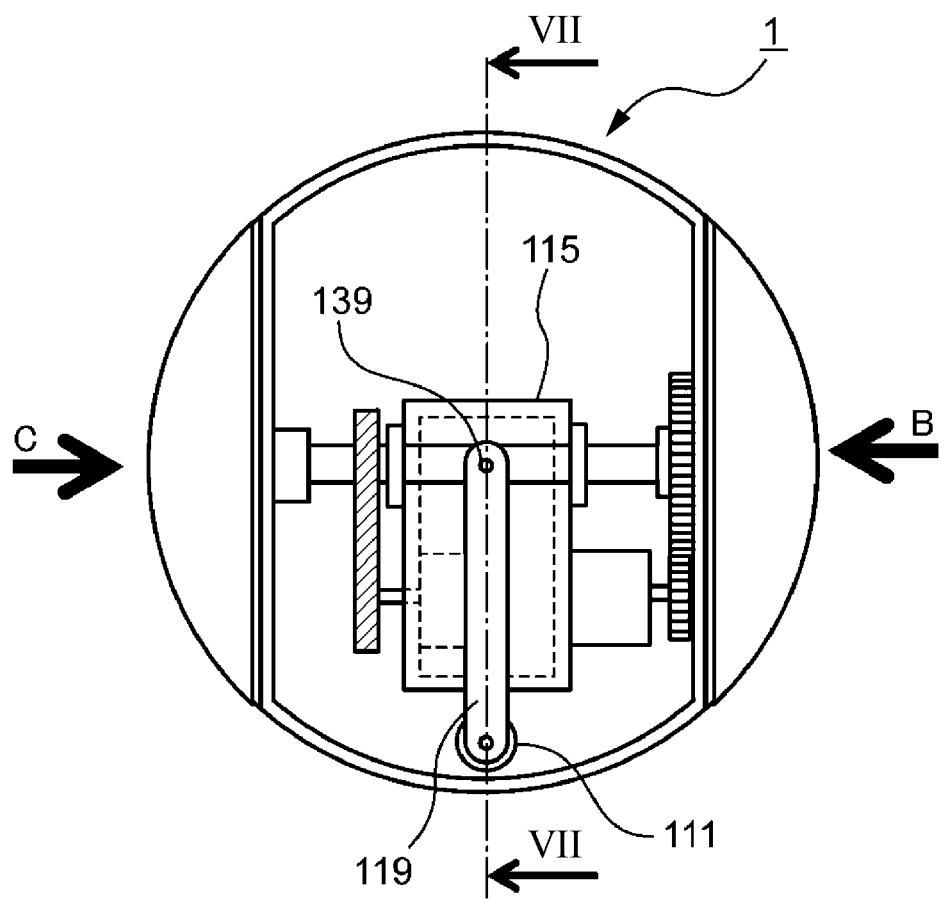

ROBOT

BACKGROUND

1. Technical Field

The present disclosure relates to a robot that makes a dialogue with the user.

2. Description of the Related Art

Heretofore, various robots have been proposed.

Japanese Unexamined Patent Application Publication No. 2011-227237 discloses a communication robot. In Japanese Unexamined Patent Application Publication No. 2011-227237, the robot determines whether or not to perform a reply impossible action indicating that a reply to input voice cannot be made, based on reliability of the input voice calculated by a voice recognition unit, and when determining to perform the reply impossible action, selects the reply impossible action such as tilting of its head from predetermined response actions that can be performed by the communication robot. This prevents the robot from recognizing, as voice, a monologue, an unknown word, or noise other than the voice, and wrongly making a speech (For example, paragraphs [0004] to [0007], and [0113]).

Japanese Unexamined Patent Application Publication No. 2002-116792 relates to a robot controller. In Japanese Unexamined Patent Application Publication No. 2002-116792, the robot uses a voice recognition unit to recognize voice inputted from a microphone, and when voice recognition fails or is low in reliability, performs a predetermined action such as tilting its head or placing its palm behind its ear (for example, paragraphs [0003] to [0005]).

SUMMARY

The above-mentioned conventional techniques need to be further improved.

In one general aspect, the techniques disclosed here feature a robot including: a spherical housing including a main housing portion, a first spherical cap portion, and a second spherical cap portion, wherein the main housing portion is disposed between the first spherical cap portion and the second spherical cap portion; an input device provided in the spherical housing; an output device provided in the spherical housing; a shaft that is provided in the main housing portion, and that couples the first spherical cap portion and the second spherical cap portion; a weight that is provided in the main housing portion and configured to rotate around a pivot that is orthogonal to the shaft to reciprocally move the weight in opposite directions of the pivot; an arm extending from the shaft in a direction orthogonal to the shaft; a display that is provided on the arm, and configured to display at least a portion of an image of a face of the robot; a first drive mechanism that rotates the pivot of the weight; a second drive mechanism that rotates the main housing portion around the shaft; and a control circuit that, when outputting, via the output device, a response to an input instruction received from a user, via the input device, based on a predetermined processing is determined to require a predetermined time or more, controls the first drive mechanism during the predetermined processing such that the first drive mechanism rotates the weight around the pivot to reciprocally move the weight in the opposite directions of the pivot.

The above-described aspect can achieve an improvement.

These general and specific aspects may be implemented using a system, a method, and a computer program, and any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a view illustrating a first drive mechanism of the robot according to the first embodiment of the present disclosure;

Figure 1A:
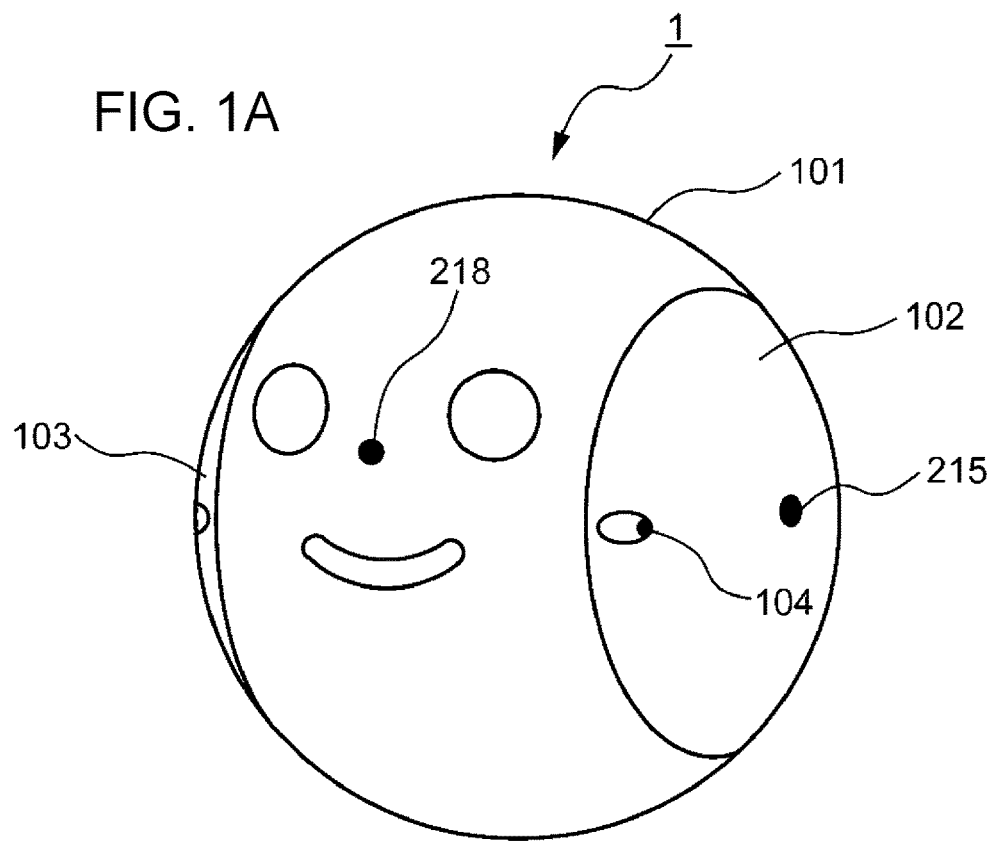
FIG. 1A is a perspective view illustrating the external appearance of a robot according to a first embodiment of the present disclosure.

DETAILED DESCRIPTION (Underlying Knowledge Forming Basis of Aspect of the Present Disclosure)

First, description is provided for a point of concern based on which an aspect of the present disclosure was made.

Japanese Unexamined Patent Application Publication No. 2011-227237 discloses a bipedal walking humanoid robot. The robot includes a head, arms, legs, a body, and so on. Thus, based on a recognition result on the user's input voice, the robot can operate the head, the arms, the legs, and the body to respond to the voice of a user.

Japanese Unexamined Patent Application Publication No. 2002-116792 relates to a dog-shaped pet robot. The pet robot includes a body, a head, four legs, a tail, and so on. Thus, based on a recognition result on the user's input voice, the pet robot can operate the body, the head, the four legs, and the tail to respond to the voice.

As described above, various robots have the function to make a response to a question from the user. As disclosed in Japanese Unexamined Patent Application Publication No. 2011-227237 or Japanese Unexamined Patent Application Publication No. 2002-116792 above, in the case where a response to the user's question is to be made by means of voice recognition, a time interval between the user's speech and the robot's response needs to be set small in order to prevent the user from feeling that the dialogue with the robot is interrupted. For this reason, presumably, irrespective whether the reliability of the voice recognition result is high or low, the robot is designed to respond to the user's speech within a relatively short time.

However, there is a case where the time interval between the user's speech and the robot's response is relatively long. For example, such situation occurs when the user asks the robot what object he/she holds, and the robot responds using an image recognition function.

When a response to the user's question is to be made using the image recognition function, the robot takes an image of the object, and transmits the taken image to an external server having an image recognition function. After the external server recognizes the image, the robot receives a recognition result from the external server, and answers what the object based on the recognition result is. In this case, if the time required from the user's question to the robot's response is about 15 seconds, the robot keeps the user waiting for the response.

When the robot cannot respond to the user's question for predetermined seconds or more as described above, the user cannot determine whether the robot is under processing or is out or order, based on only the external appearance of the robot. This is problematic.

In the case of a spherical robot including no hand, leg, neck, or the like, unlike the robots in Japanese Unexamined Patent Application Publication No. 2011-227237 and Japanese Unexamined Patent Application Publication No. 2002-116792, the robot cannot notify the user that the robot is under processing, by moving its hand or leg or tilting its head. The spherical robot may display an indication of the in-process state on the surface of the spherical robot. In this case, however, when such indication is displayed on the spherical robot including no hand, leg, or neck, the face of the spherical robot becomes unnatural because the indication other than facial elements is displayed on the face.

As described above, the spherical robot including no hand, leg, neck, or the like has such constraints in notifying the user of a progress state of internal processing.

In consideration of this, the Inventor thought of the aspect of the present disclosure.

A robot according to an aspect of the present disclosure is a robot including:
 a spherical housing including a main housing portion, a first spherical cap portion, and a second spherical cap portion,
  wherein the main housing portion is disposed between the first
 spherical cap portion and the second spherical cap portion;
 an input device provided in the spherical housing;
 an output device provided in the spherical housing;
 a shaft that is provided in the main housing portion, and that couples the first spherical cap portion and the second spherical cap portion;
 a weight that is provided in the main housing portion and configured to rotate around a pivot that is orthogonal to the shaft to reciprocally move the weight in opposite directions of the pivot;

an arm extending from the shaft in a direction orthogonal to the shaft;

a display that is provided on the arm, and configured to display at least a portion of an image of a face of the robot;

a first drive mechanism that rotates the pivot of the weight;

a second drive mechanism that rotates the main housing portion around the shaft; and a control circuit that, when outputting, via the output device, a response to an input instruction received from a user, via the input device, based on a predetermined processing is determined to require a predetermined time or more, controls the first drive mechanism during the predetermined processing such that the first drive mechanism rotates the weight around the pivot to reciprocally move the weight in the opposite directions of the pivot.

The robot according to the aspect controls the first drive mechanism during the predetermined processing such that the first drive mechanism rotates the pivot of the weight to reciprocate the weight when the response to the input instruction inputted by the user via the input device is to be made via the output device based on the predetermined processing that requires the predetermined time or more.

With this configuration, when the robot needs the predetermined time for response to the users question or more, the robot swings side-to-side facing forward in the advancing direction. The swinging motion implies the state the robot is shaking its body side-to-side while thinking deeply.

Accordingly, even the spherical robot including no hand or leg, and having the constraints in notifying the user of the progress state in internal processing can notify the user that the robot is under processing, during a dialogue with the user by utilizing the movement of the weight without displaying the indication of the in-process state on the surface of the spherical robot. Consequently, just by viewing the external appearance of the robot, the user can determine whether the robot is under processing or out of order.

EMBODIMENTS

Embodiments of the present disclosure will be described below with reference to figures. Throughout the figures, the same reference numerals refer to the same components.

First Embodiment (Overall Configuration)

Figure 1B:
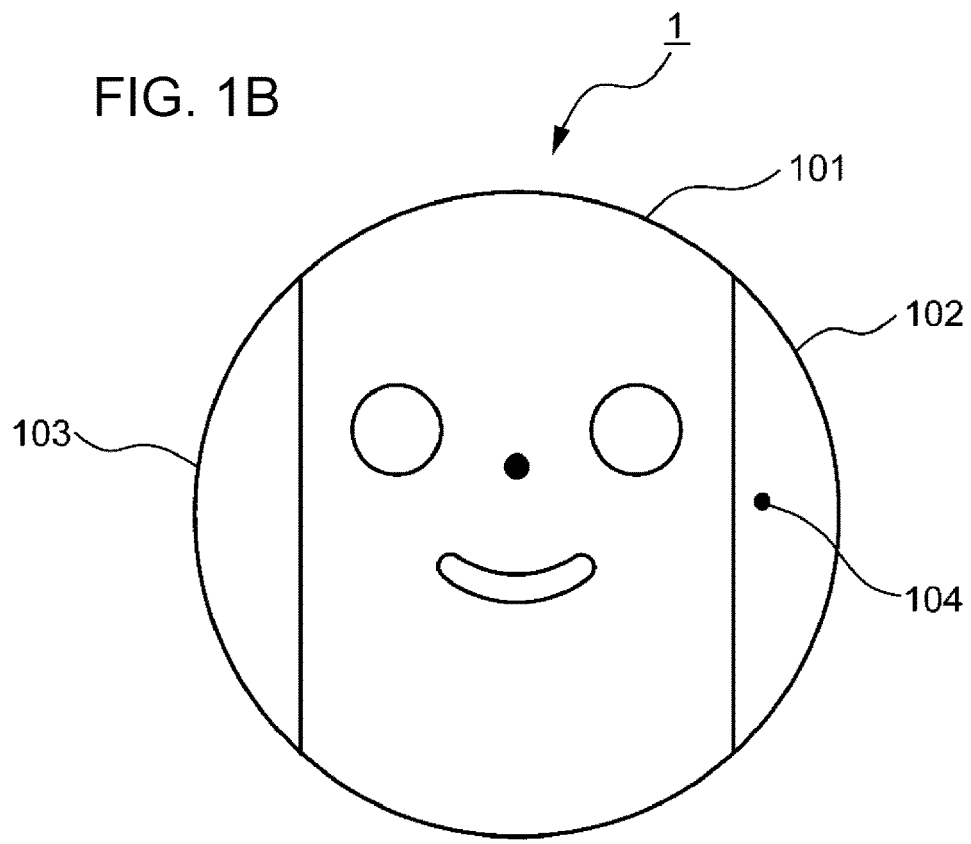
FIG. 1B is a front view illustrating the external appearance of the robot according to the first embodiment of the present disclosure.

FIG. 1A is a perspective view illustrating the external appearance of a robot 1 according to a first embodiment of the present disclosure. FIG. 1B is a front view illustrating the external appearance of the robot according to the first embodiment of the present disclosure. As illustrated in FIGS. 1A and 1B, the robot 1 includes a main housing 101 in a spherical zone shape, a first spherical cap portion 102, and a second spherical cap portion 103. The main housing 101, the first spherical cap portion 102, and the second spherical cap portion 103 collectively form a sphere. That is, the robot 1 is spherical. The main housing 101 is spherical band-shaped with a right side portion (an example of a first side portion) of the sphere and a left side portion (an example of a second side portion) opposed to the right side portion removed. The first spherical cap portion 102 corresponds to the spherical right side portion, and the second spherical cap portion 103 corresponds to the spherical left side portion.

As illustrated in FIG. 1A, the robot 1 further includes a speaker 218 in the main housing 101, and a camera 104 and a microphone 215 in the first spherical cap portion 102. The speaker 218 (an example of an output device) outputs sound information of the robot 1. The camera 104 acquires a video of environment around the robot 1. The microphone 215 (an example of an input device) acquires sound of the environment around the robot 1. In this embodiment, the robot 1 includes the speaker 218 in the main housing 101, and however, the speaker 218 may be provided in at least one of the main housing 101, the first spherical cap portion 102, and the second spherical cap portion 103. In this embodiment, the robot 1 includes the camera 104 in the first spherical cap portion 102 and however, the camera 104 may be provided in at least one of the first spherical cap portion 102 and the second spherical cap portion 103. In this embodiment, the robot 1 includes the microphone 215 in the first spherical cap portion 102 and however, the microphone 215 may be provided in at least one of the main housing 101, the first spherical cap portion 102, and the second spherical cap portion 103.

Figure 2:
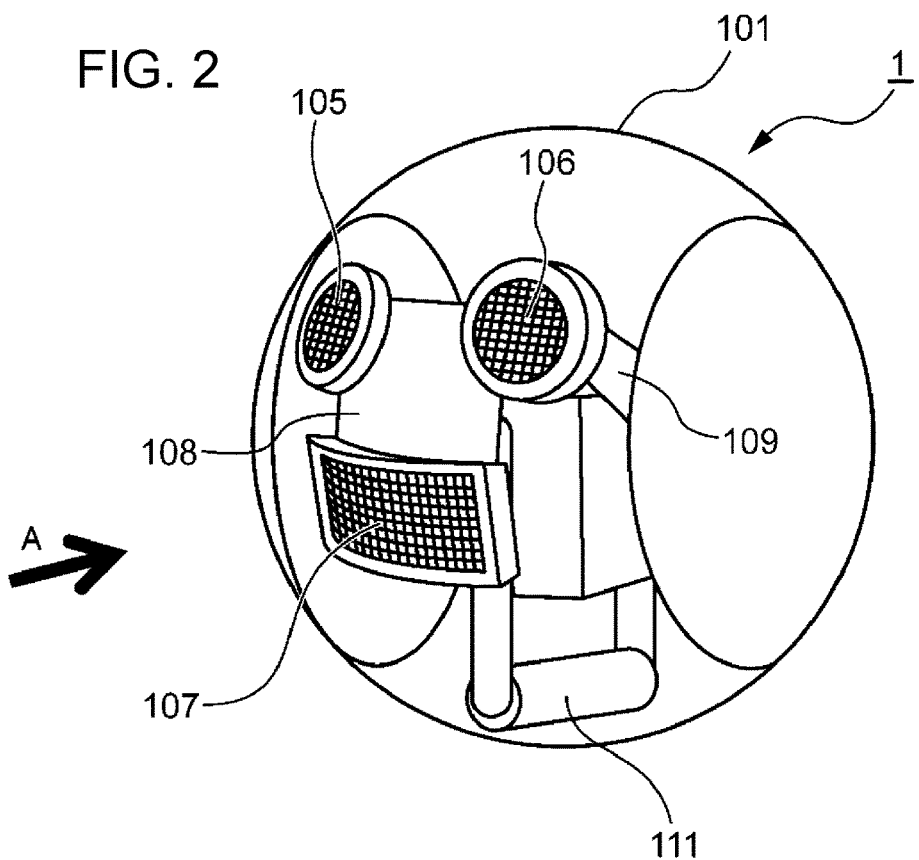
FIG. 2 is a perspective view illustrating the inside of the robot according to the first embodiment of the present disclosure.
Figure 3:
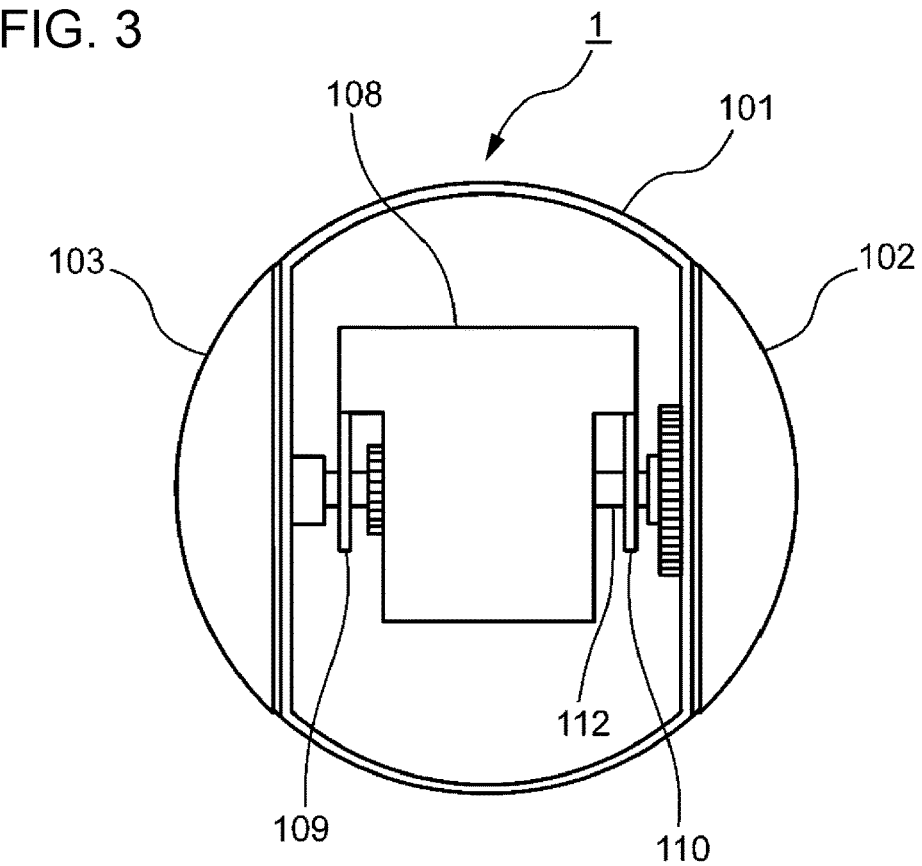
FIG. 3 is an internal plan view illustrating arms of the robot according to the first embodiment of the present disclosure.

FIG. 2 is a perspective view illustrating the inside of the robot 1 according to the first embodiment of the present disclosure. FIG. 3 is an internal plan view illustrating a first arm 109 and a second arm 110 of the robot 1 according to the first embodiment of the present disclosure.

As illustrated in FIG. 2, the robot 1 includes a first display unit 105, a second display unit 106, and a third display unit 107 within the main housing 101. The first display unit 105, the second display unit 106, and the third display unit 107 are attached to a fixed sheet metal 108. As illustrated in FIG. 3, the fixed sheet metal 108 is attached to a shaft 112 via the first arm 109 and the second arm 110. The first arm 109 and the second arm 110 are attached to the shaft 112 so as to extend from the shaft 112 in a direction orthogonal to the shaft 112. For example, the first display unit 105, the second display unit 106, and the third display unit 107 are formed of a plurality of light emitting diodes. The first display unit 105, the second display unit 106, and the third display unit 107 display information displaying facial expressions of the robot 1. Specifically, the first display unit 105, the second display unit 106, and the third display unit 107 each independently control lighting of the plurality of light emitting diodes to display a portion of a face of the robot 1, such as an eye and a mouth, as illustrated in FIGS. 1A and 1B. In the example illustrated in FIG. 1, the first display unit 105 displays an image of the left eye, the second display unit 106 displays an image of the right eye, and the third display unit 107 displays an image of the mouth. The images of the left eye, the right eye, and the mouth penetrate the main housing 101 made of a transparent or translucent member, and are emitted to the outside.

As illustrated in FIG. 2, the robot 1 includes a weight 111 in the lower portion of the main housing 101. Accordingly, the center of gravity of the robot 1 is located below the center of the main housing 101. This can stabilize the operation of the robot 1. A first drive mechanism 211 (FIG. 16) for driving the weight 111 and details of the operation of the first drive mechanism 211 (FIG. 16) will be described later.

Figure 4:
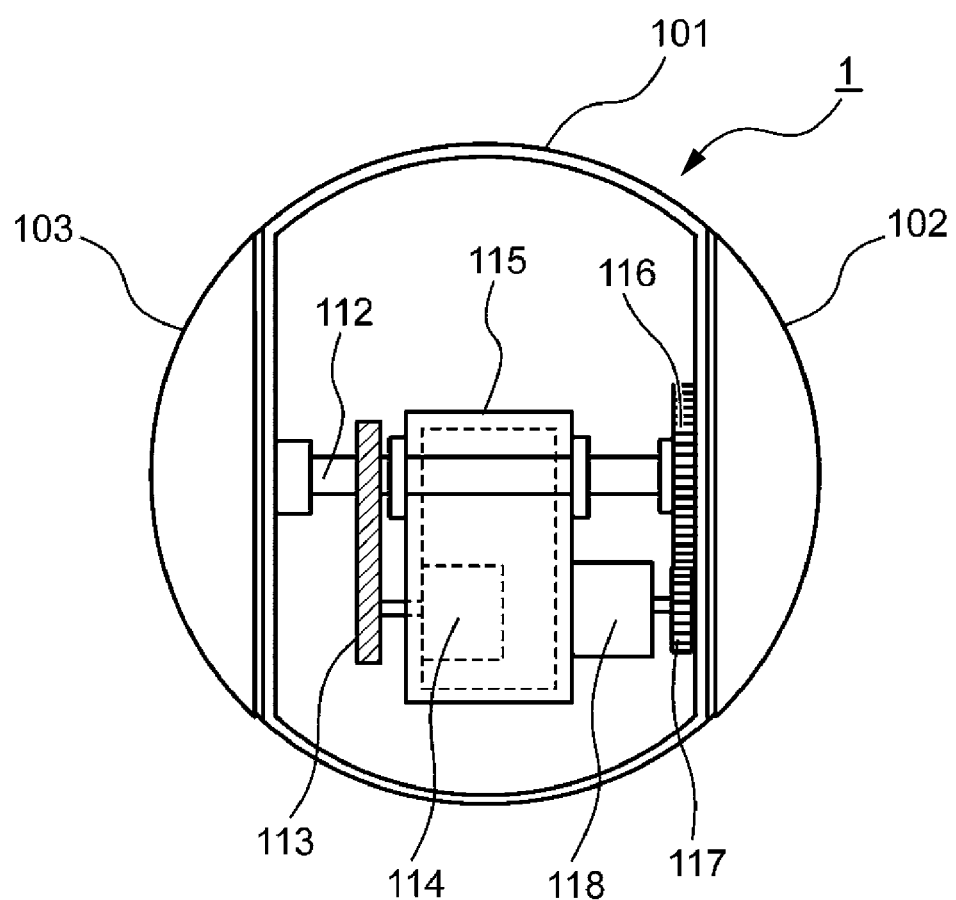
FIG. 4 is a view illustrating a third drive mechanism that rotates a first spherical cap portion and a second spherical cap portion, and a second drive mechanism that rotates a main housing in the robot according to the first embodiment of the present disclosure.
Figure 5A:
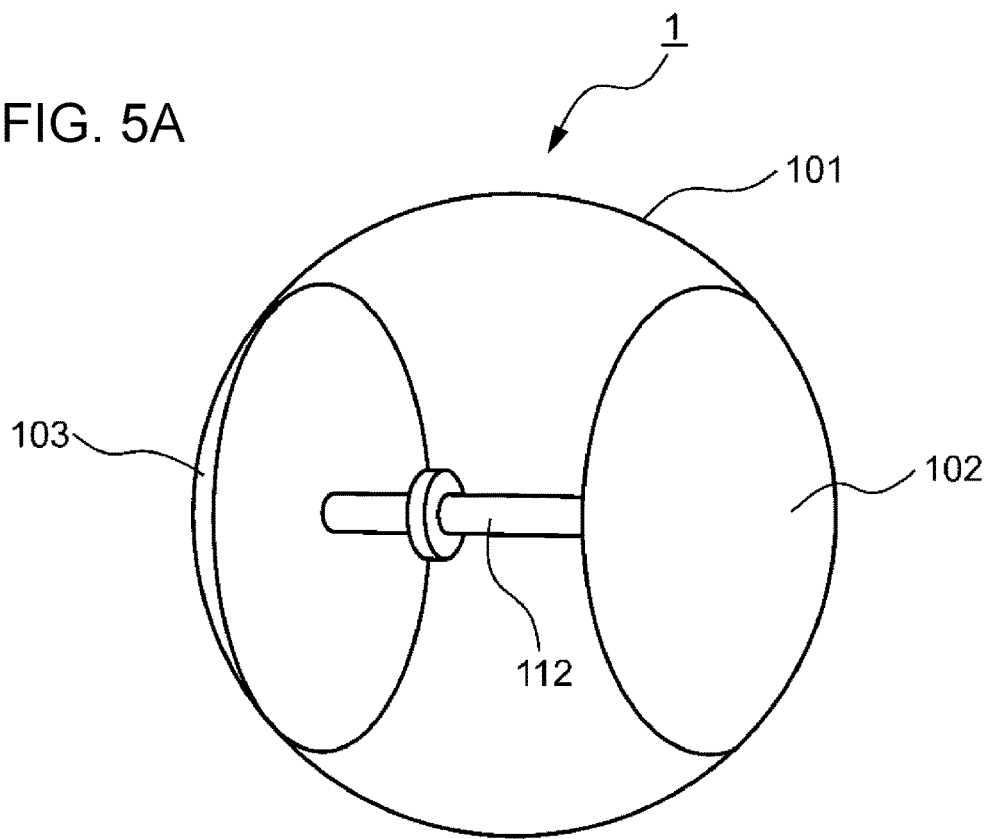
FIG. 5A is an internal perspective view illustrating the inside of the coupling state between the first spherical cap portion and the second spherical cap portion of the robot according to the first embodiment of the present disclosure.
Figure 5B:
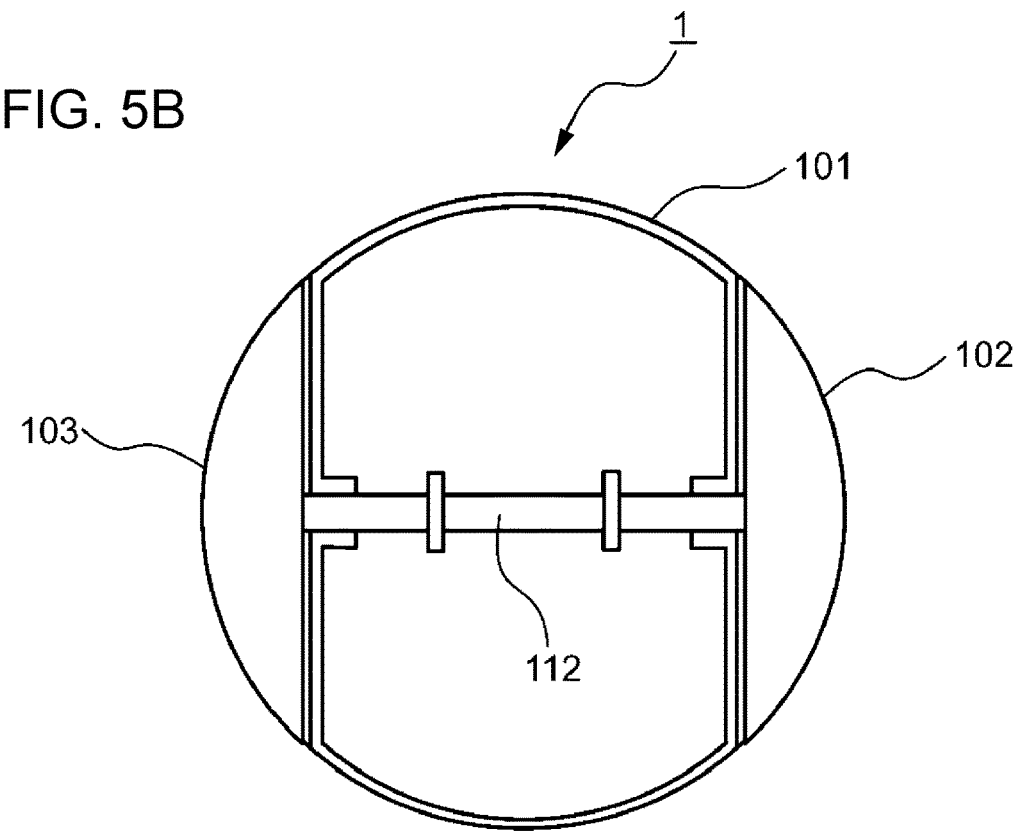
FIG. 5B is an internal front view illustrating the inside of the coupling state between the first spherical cap portion and the second spherical cap portion of the robot according to the first embodiment of the present disclosure.

Next, an independent third drive mechanism 207 (FIG. 16) that rotates the first spherical cap portion 102 and the second spherical cap portion 103, which is independent from a second drive mechanism 209 (FIG. 16) will be described with reference to FIGS. 4, 5A, 5B. FIG. 4 is a view illustrating the third drive mechanism 207 (FIG. 16) that rotates the first spherical cap portion 102 and the second spherical cap portion 103, and the second drive mechanism 209 (FIG. 16) that rotates the main housing 101 in the robot 1 according to the first embodiment of the present disclosure. FIG. 5A is an internal perspective view illustrating the coupling state between the first spherical cap portion 102 and the second spherical cap portion 103 of the robot 1 according to the first embodiment of the present disclosure. FIG. 5B is an internal front view illustrating the coupling state between the first spherical cap portion 102 and the second spherical cap portion 103 of the robot 1 according to the first embodiment of the present disclosure. In FIG. 4, the third drive mechanism 207 (FIG. 16) includes the shaft 112 that is provided in the main housing 101 and that couples the first spherical cap portion 102 to the second spherical cap portion 103 (FIG. 8), a first gear 122 attached to the shaft 112 (FIG. 8), a drive belt 113 attached to first gear 122 (FIG. 8), a second gear 123 (FIG. 8) that transmits a motive power to the drive belt 113, a first motor 114 coupled to the second gear 123 (FIG. 8), and a frame 115 that fixes the first motor 114.

In FIGS. 5A and 5B, the first spherical cap portion 102 is coupled to the second spherical cap portion 103 via the shaft 112. In contrast, in FIG. 5B, the shaft 112 is not affixed to the main housing 101. Accordingly, when the shaft 112 rotates, the first spherical cap portion 102 and the second spherical cap portion 103, which are coupled to the shaft 112, rotate in synchronization with the shaft 112, but the main housing 101 does not rotate. As discussed above, the fixed sheet metal 108 (FIG. 3) is attached to the shaft 112 via the first arm 109 and the second arm 110. Thus, with the rotation of the shaft 112, that is, the rotation of the first spherical cap portion 102 and the second spherical cap portion 103, the first display unit 105, the second display unit 106, and the third display unit 107 provided in the fixed sheet metal 108 also rotate in sync with the first spherical cap portion 102 and the second spherical cap portion 103. Details of the operation of the third drive mechanism 207 (FIG. 16) will be described later with reference to FIGS. 8 to 10.

Next, the second drive mechanism 209 (FIG. 16) that rotates the main housing 101 will be described with reference to FIG. 4. In FIG. 4, the second drive mechanism 209 (FIG. 16) includes a third gear 116 fixed to the main housing 101, a fourth gear 117 that engages with the third gear 116, a second motor 118 coupled to the fourth gear 117, and a frame 115 that fixes the second motor 118. In this embodiment, the center of the third gear 116 matches the center of the shaft 112. Details of the operation of the second drive mechanism 209 (FIG. 16) will be described later with reference to FIGS. 11 and 12.

Figure 7:
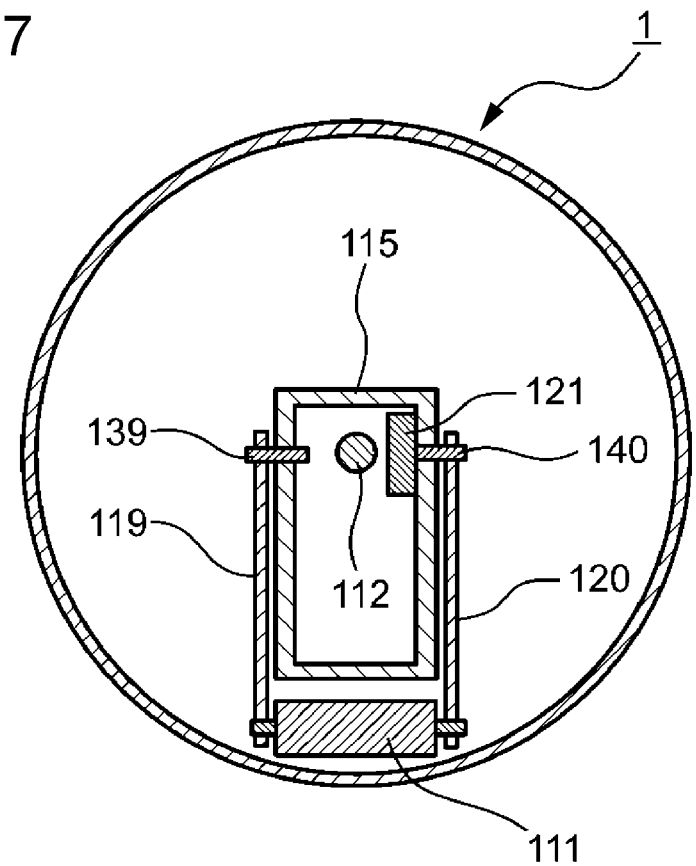
FIG. 7 is a sectional view of the robot according to the first embodiment of the present disclosure taken along VII-VII in FIG. 6.

Next, the first drive mechanism 211 (FIG. 16) will be described with reference to FIGS. 6 and 7. FIG. 6 is a view illustrating the first drive mechanism 211 (FIG. 16) of the robot 1 according to the first embodiment of the present disclosure. FIG. 7 is a sectional view illustrating the robot 1 according to the first embodiment of the present disclosure in FIG. 6 taken along VII-VII. As illustrated in FIGS. 6 and 7, the first drive mechanism 211 (FIG. 16) includes a third arm 119 that supports one end of the weight 111, a fourth arm 120 that supports the other end of the weight 111, a third motor 121, and a driven shaft 139. A pivot 140 of the driven shaft 139 and the third motor 121 is arranged orthogonally to the shaft 112 and is rotatably attached to the frame 115. The driven shaft 139 is coupled to one end of the third arm 119, which does not support the weight 111. The pivot 140 of the third motor 121 is coupled to one end of the fourth arm 120, which does not support the weight 111. In this embodi-ment, the pivot 140 of the third motor 121 is rotatably attached to the frame 115. Accordingly, even when the pivot 140 of the third motor 121 rotates, the frame 115 does not rotate in sync with this. Details of the operation of the first drive mechanism 211 (FIG. 16) will be described later with reference to FIGS. 13 to 15.

The robot 1 further includes a control circuit 201 (FIG. 16), and a power source and a charger that are not illustrated. The control circuit 201 controls various operations of the robot 1. Details of the control circuit 201 will be described later with reference to FIG. 16.

The robot 1 is charged by the charger. The power source manages electric power stored through controls of a power source control unit and a charge control unit of the charger, which are not illustrated, in the robot 1.

Next, the details of the operation of the third drive mechanism 207 (FIG. 16) will be described with reference to FIGS. 8 to 10.

Figure 8:
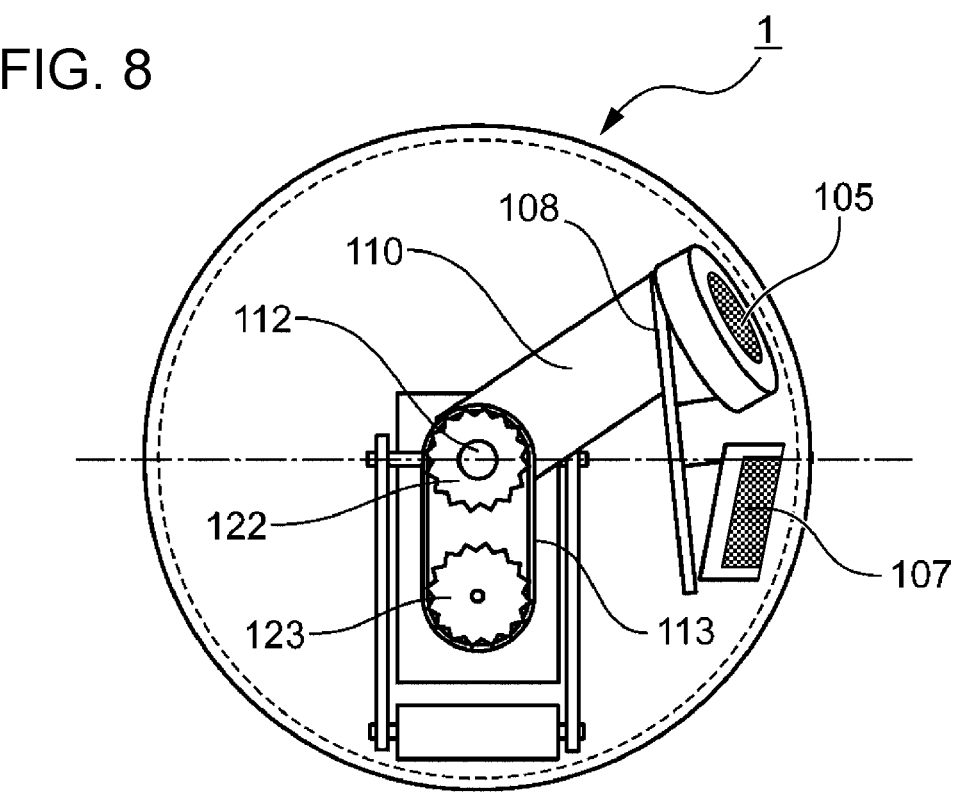
FIG. 8 is a side view illustrating a third drive mechanism of the robot according to the first embodiment of the present disclosure when viewed from C in FIG. 6.

FIG. 8 is a side view illustrating the third drive mechanism 207 (FIG. 16) of the robot 1 according to the first embodiment of the present disclosure when viewed from C in FIG. 6. FIG. 9 is a side view illustrating the state where the first display unit 105, the second display unit 106, and the third display unit 107 of the robot 1 according to the first embodiment of the present disclosure tilt forward when viewed from C in FIG. 6. FIG. 10 is a side view illustrating the state where the first display unit 105, the second display unit 106, and the third display unit 107 of the robot 1 according to the first embodiment of the present disclosure tilt backward when viewed from C in FIG. 6.

In FIG. 8, the first display unit 105, the second display unit 106, and the third display unit 107 of the robot 1 face forward at a default position. When the first motor 114 (FIG. 4) is driven, the second gear 123 coupled to the first motor 114 rotates. The motive power is transmitted to the first gear 122 via the drive belt 113, and the shaft 112 fixed to the first gear 122 rotates in synchronization with driving of the first motor 114. As illustrated in FIG. 3, the fixed sheet metal 108 is attached to the shaft 112 via the first arm 109 and the second arm 110. The first spherical cap portion 102 and the second spherical cap portion 103 are coupled to the shaft 112 (FIGS. 5A and 5B). Accordingly, with rotation of the shaft 112, that is, the rotation of the first spherical cap portion 102 (FIG. 5B) and the second spherical cap portion 103 (FIG. 5B), the first display unit 105, the second display unit 106, and the third display unit 107 that are provided in the fixed sheet metal 108 (FIG. 3) also rotate in sync with the shaft 112.

Figure 9:
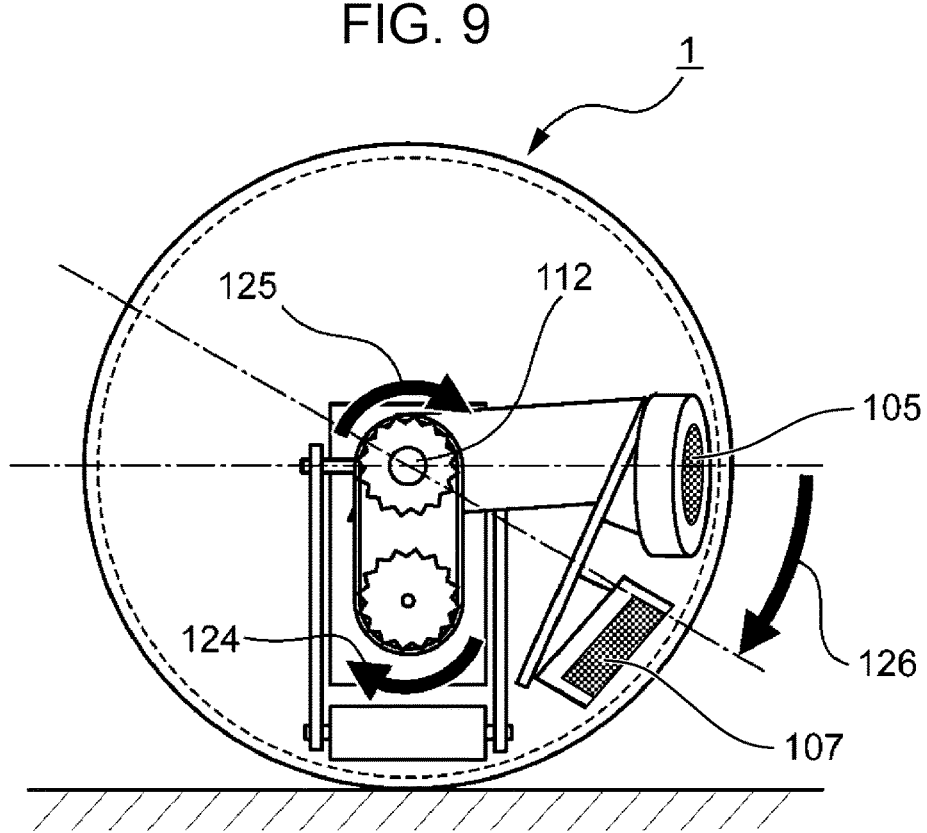
FIG. 9 is a side view illustrating the state where a first display unit, a second display unit, and a third display unit of the robot according to the first embodiment of the present disclosure tilt forward when viewed from C in FIG. 6.

As illustrated in FIG. 9, when the shaft 112 rotates from the default position in the direction represented by an arrow 124 and an arrow 125, the first display unit 105, the second display unit 106 (FIG. 2), and the third display unit 107 tilt forward as represented by an arrow 126.

Figure 10:
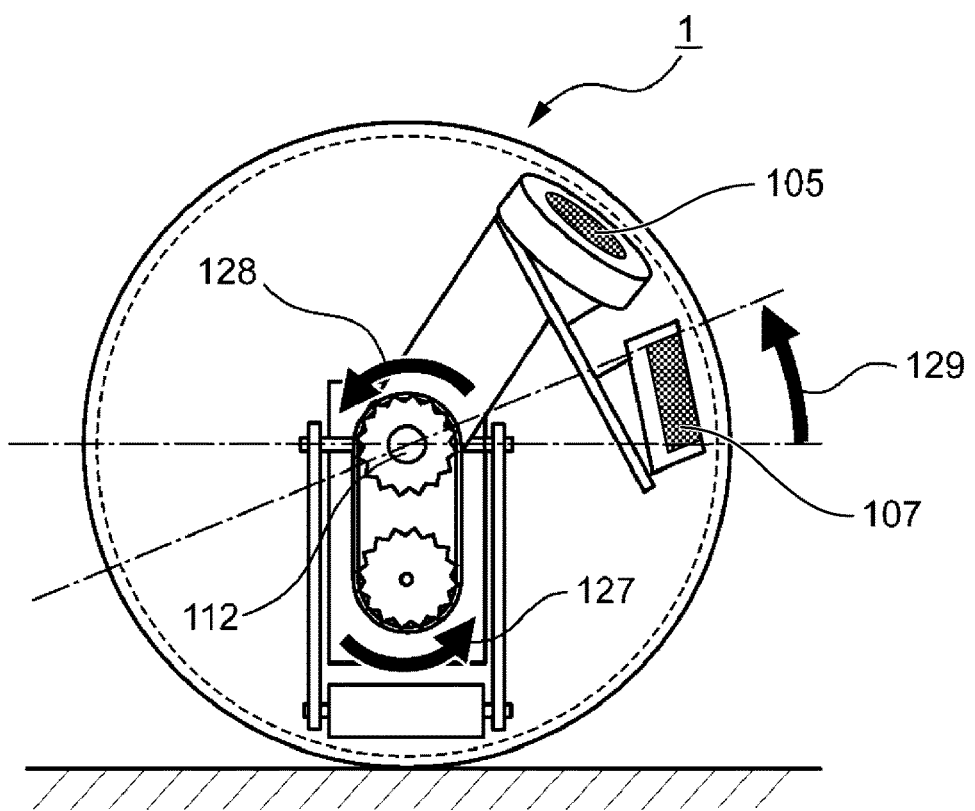
FIG. 10 is a side view illustrating the state where the first display unit, the second display unit, and the third display unit of the robot according to the first embodiment of the present disclosure tilt backward when viewed from C in FIG. 6.

In contrast, as illustrated in FIG. 10, when the shaft 112 rotates from the default position in the direction represented by an arrow 127 and an arrow 128, the first display unit 105, the second display unit 106 (FIG. 2), and the third display unit 107 tilt backward as represented by an arrow 129.

As described above, in the robot 1, the third drive mechanism 207 can switch the rotating direction of the shaft 112, that is, the rotating direction of the first spherical cap portion 102 and the second spherical cap portion 103, thereby tilting the first display unit 105, the second display unit 106, and the third display unit 107 forward and backward. When the rotating direction of the first spherical cap portion 102 and the second spherical cap portion 103 is switched, the first display unit 105, the second display unit 106, and the third display unit 107 tilt forward as represented by the arrow 126 or backward as represented by an arrow 129. That is, the first display unit 105, the second display unit 106, and the third display unit 107 vertically reciprocate.

As discussed above, the first display unit 105, the second display unit 106, and the third display unit 107 each represent a portion of the face of the robot 1, such as an eye or a mouth. Therefore, for example, the state where the robot 1 is short of breath or sleepy can be expressed by switching the rotating direction of the first spherical cap portion 102 and the second spherical cap portion 103 to vertically reciprocate the first display unit 105, the second display unit 106, and the third display unit 107. By performing this control when remaining power of the power source reaches a predetermined value or less, the robot 1 can notify the user that remaining power of the power source is small, without displaying information on the remaining power, which is unrelated to the facial expression, on any of the first display unit 105, the second display unit 106, and the third display unit 107.

Next, details of the operation of the second drive mechanism 209 (FIG. 16) will be described with reference to FIGS. 11 and 12.

Figure 11:
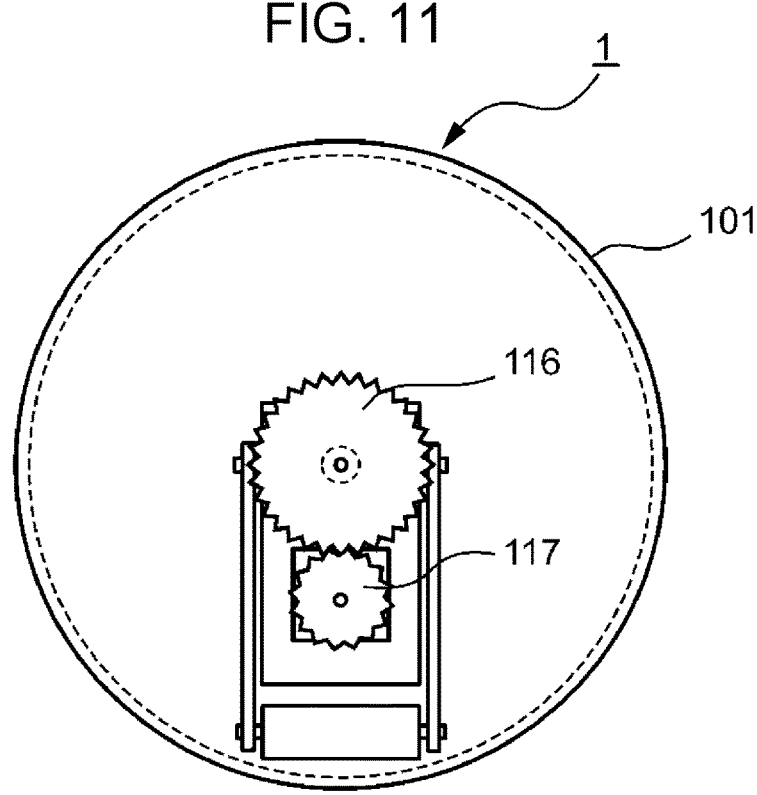
FIG. 11 is a side view illustrating a second drive mechanism of the robot according to the first embodiment of the present disclosure when viewed from B in FIG. 6.

FIG. 11 is a side view illustrating the second drive mechanism 209 (FIG. 16) of the robot 1 according to the first embodiment of the present disclosure when viewed from B in FIG. 6. FIG. 12 is a side view illustrating straight movement of the robot according to the first embodiment of the present disclosure when viewed from B in FIG. 6.

In FIG. 11, when the second motor 118 (FIG. 4) is driven, the fourth gear 117 coupled to the second motor 118 rotates. The motive power is transmitted to the third gear 116 that engages with the fourth gear 117. Thereby, the main housing 101 fixed to the third gear 116 rotates in synchronization with driving of the second motor 118.

Figure 12:
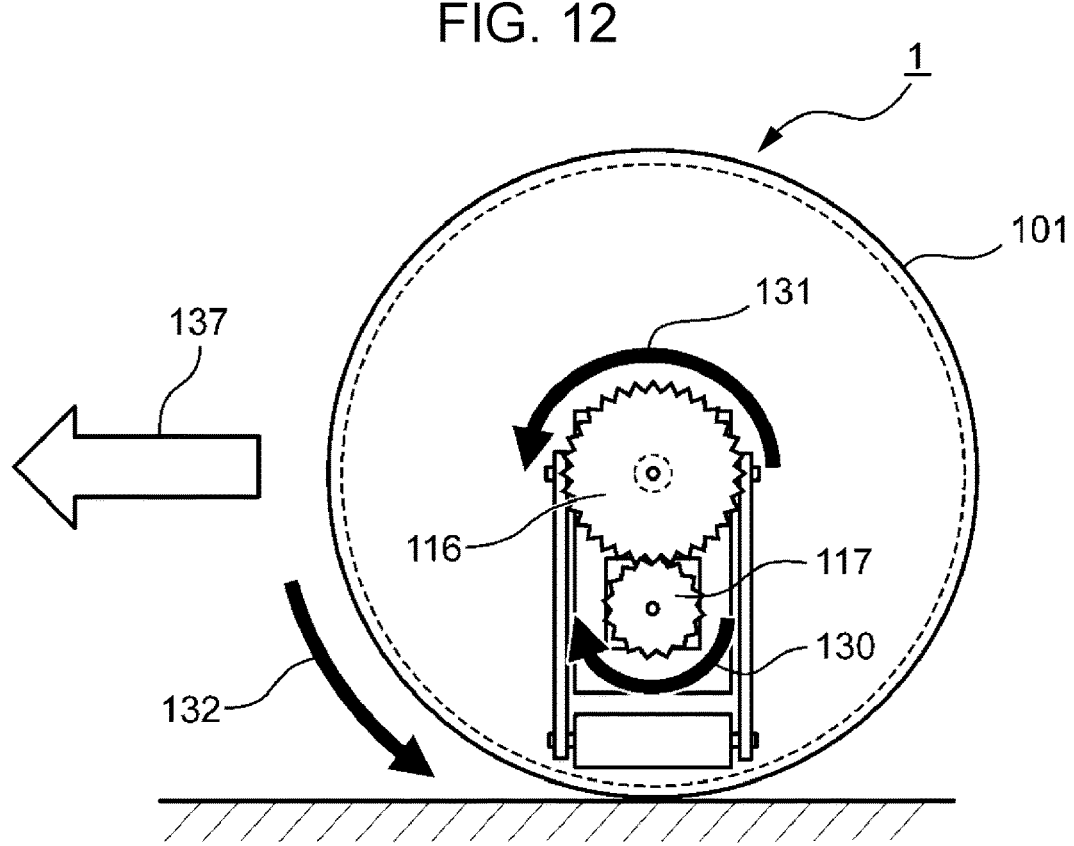
FIG. 12 is a side view illustrating straight movement of the robot according to the first embodiment of the present disclosure when viewed from B in FIG. 6.
Figure 16:
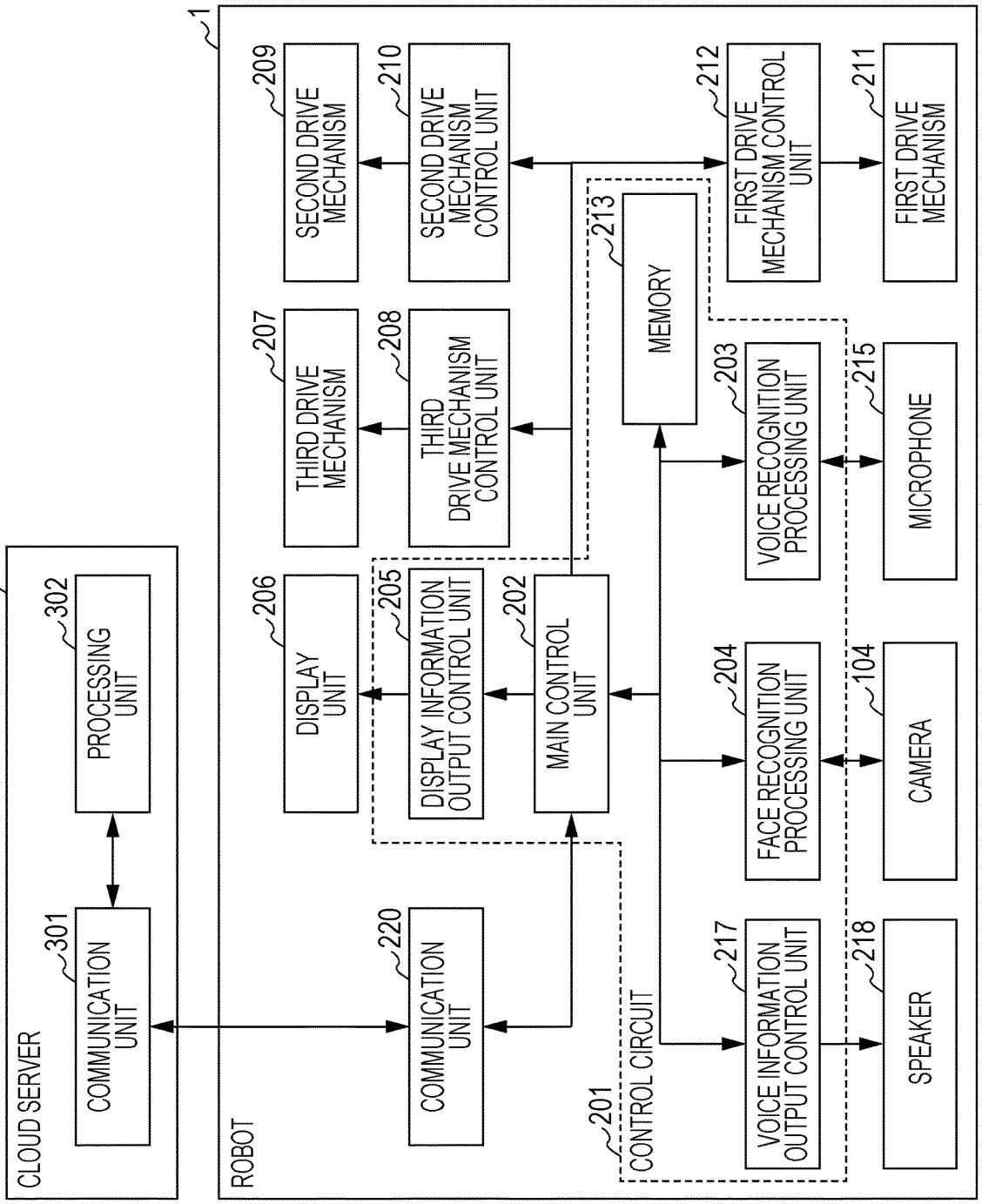
FIG. 16 is a block diagram illustrating the robot according to the first embodiment of the present disclosure, and a cloud server connected to the robot.

As illustrated in FIG. 12, when the second motor 118 (FIG. 4) is rotated in the direction represented by an arrow 130, the third gear 116 that engages with the fourth gear 117 rotates in the direction represented by an arrow 131. Then, the main housing 101 fixed to the third gear 116 rotates in the direction represented by an arrow 132. As a result, the robot 1 advances in the direction represented by an arrow 137. The direction represented by the arrow 137 corresponds to an example of the advancing direction by the second drive mechanism. When the second motor 118 is rotated in the direction opposite to the direction represented by the arrow 130, the robot 1 moves backward, that is, in the direction opposite to the direction represented by the arrow 137. In this manner, the robot 1 can move forward and backward by switching the rotating direction of the second motor 118 in the second drive mechanism 209 (FIG. 16).

Next, details of the operation of the first drive mechanism 211 (FIG. 16) will be described with reference to FIGS. 13A to 13C.

Figure 13A:
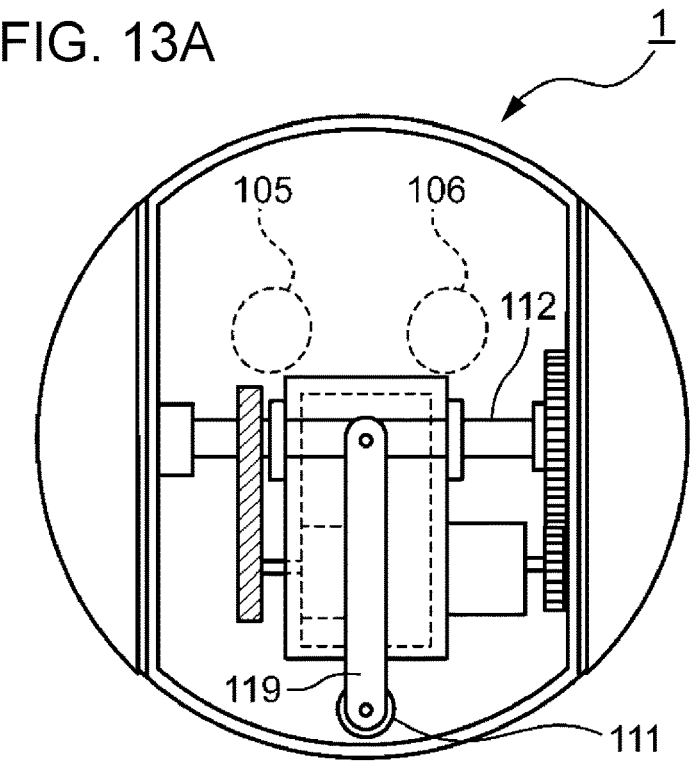
FIG. 13A is a front view illustrating the position of the robot in the state where a weight of the robot according to the first embodiment of the present disclosure is located at the center when viewed from A in FIG. 2.

FIG. 13A is a front view illustrating the position of the robot 1 in the state where the weight 111 of the robot 1 according to the first embodiment of the present disclosure is located at the center when viewed from A in FIG. 2. FIG. 13B is a front view illustrating the position of the robot 1 in the state where the weight 111 of the robot 1 according to the first embodiment of the present disclosure is biased to left when viewed from A in FIG. 2. FIG. 13C is a front view illustrating the position of the robot 1 in the state where the weight 111 of the robot 1 according to the first embodiment of the present disclosure is biased to right when viewed from A in FIG. 2.

As described above, the first display unit 105, the second display unit 106, and the third display unit 107 of the robot 1 face forward at the default position (See FIG. 8). That is, the first display unit 105, the second display unit 106, and the third display unit 107 (FIG. 2) do not tilt. In this case, as illustrated in FIG. 13A, when viewed from A in FIG. 2, third arm 119 is orthogonal to the shaft 112, and the weight 111 is located at the center in the horizontal direction. The central position in the horizontal direction corresponds to an example of the default position of the weight.

Figure 13B:
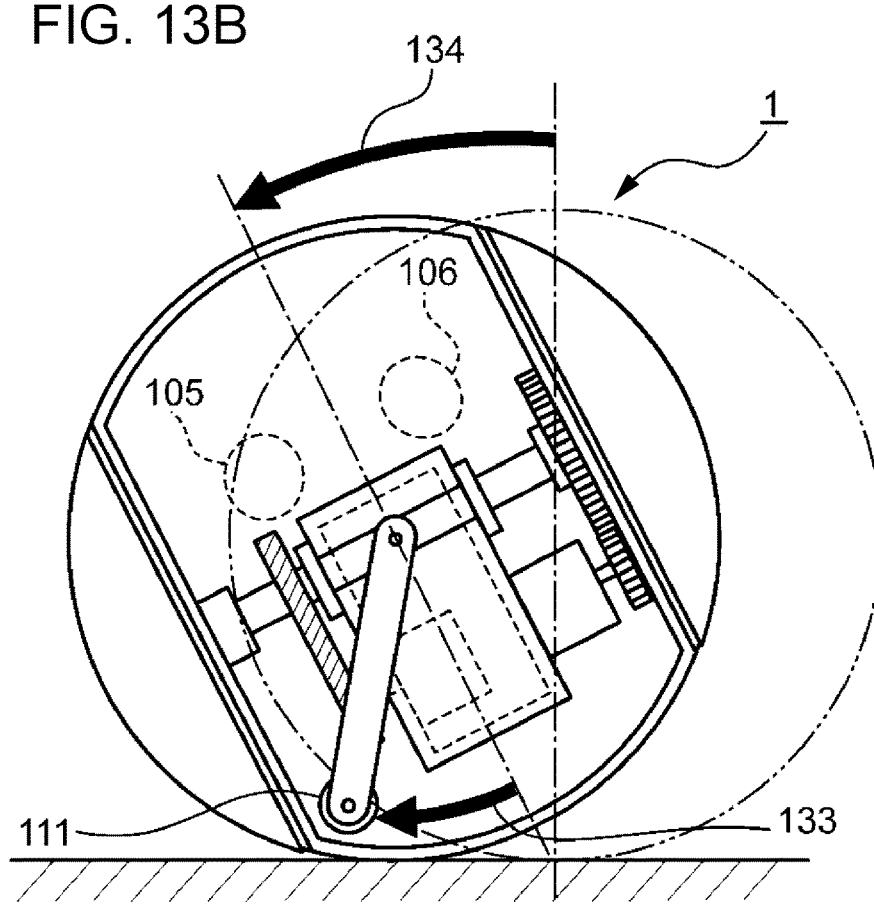
FIG. 13B is a front view illustrating the position of the robot in the state where a weight of the robot according to the first embodiment of the present disclosure is biased to left when viewed from A in FIG. 2.
Figure 13C:
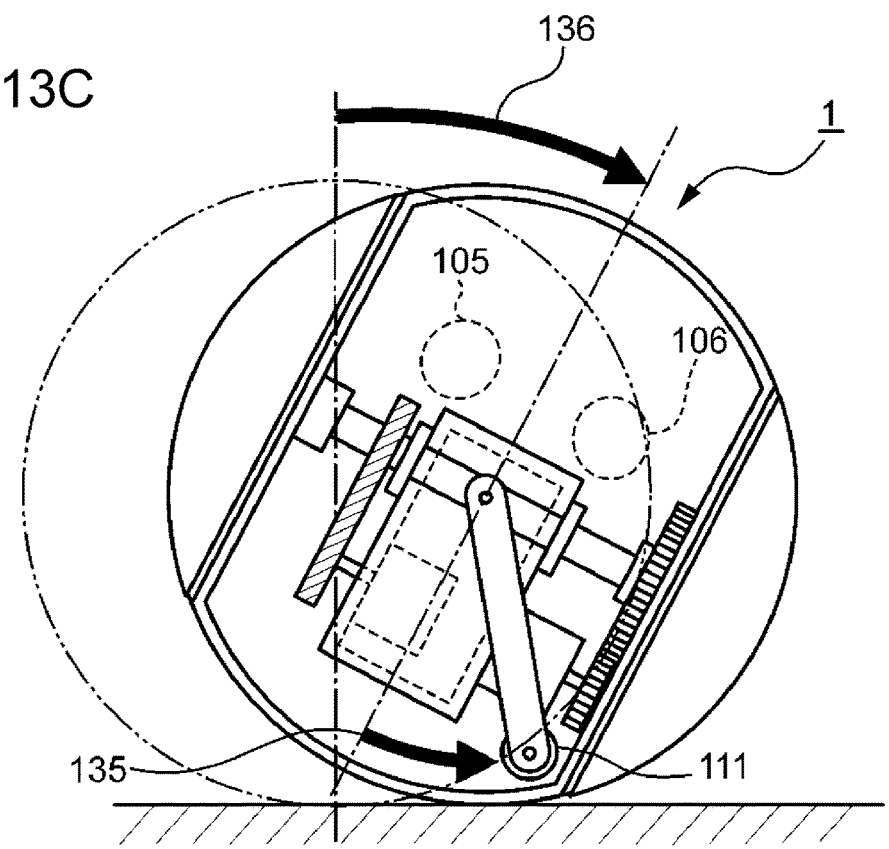
FIG. 13C is a front view illustrating the position of the robot in the state where the weight of the robot according to the first embodiment of the present disclosure is biased to right when viewed from A in FIG. 2.

As illustrated in FIG. 13B, when the third motor 121 (FIG. 7) is driven to move the weight 111 from the central position to left as represented by an arrow 133, the first display unit 105, the second display unit 106, and the third display unit 107 (FIG. 2) tilt to left as represented by an arrow 134. In contrast, when the third motor 121 is driven to the move weight 111 from the central position to right as represented by an arrow 135 as illustrated in FIG. 13C, the first display unit 105, the second display unit 106, and the third display unit 107 (FIG. 2) tilt to right as represented by an arrow 136.

As described above, the first display unit 105, the second display unit 106, and the third display unit 107 can be tilted to left or right by switching the rotating direction of the third motor 121 in the first drive mechanism 211. When the rotating direction of the third motor 121 is switched, the robot 1 tilts to left as represented by the arrow 134 or to right as represented by the arrow 136. That is, the robot 1 transversely rotates at a predetermined angle.

As described above, the first display unit 105, the second display unit 106, and the third display unit 107 each represent a portion of the face of the robot 1, such as an eye or a mouth. Thus, by causing the robot 1 to tilt to right or left using the weight 111, for example, the robot 1 can expresses the state where the robot 1 is in a good mood or is under thinking.

The method of converting the travelling direction of the robot 1 using the weight 111 will be described below. In this embodiment, the second drive mechanism 209 that rotates the main housing 101 by itself can merely move the main housing 101 forward or backward in the travelling direction. The second drive mechanism 209 alone cannot switch the travelling direction of the main housing 101 to right or left. Thus, the robot 1 uses the weight 111 to switch the travelling direction of the main housing 101 to right or left. That is, the robot 1 changes the travelling direction by combining the forward or backward movement driven by the second drive mechanism 209 with rightward or leftward tilt of the robot 1 driven by the first drive mechanism 211. Specifically, when the first drive mechanism 211 transfers the weight 111 from the central position (FIG. 13A) to left (FIG. 13B) or right (FIG. 13C), the center of gravity of the robot 1 shifts from the central position. When the second drive mechanism 209 causes the above-mentioned backward movement, the robot 1 gradually advances in the form of an arc while following the movement of the weight 111. That is, the robot 1 can change its direction by advancing while turning to left or right. In this manner, the first drive mechanism 211 for the weight can be used to change the direction of the robot 1.

Figure 14:
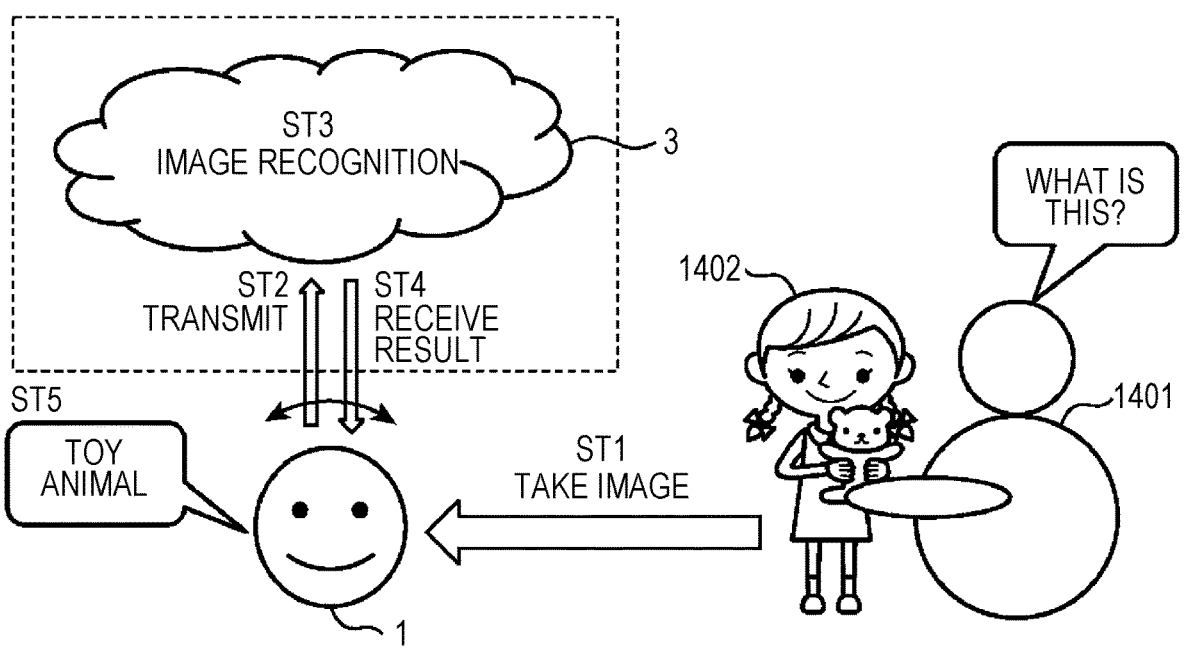
FIG. 14 is a view illustrating an example of the use case of the robot according to the first embodiment of the present disclosure.

Next, an example of a use case of the robot 1 according to the first embodiment of the present disclosure will be described with reference to FIG. 14. FIG. 14 is a view illustrating an example of the use case of the robot 1 according to the first embodiment of the present disclosure. As illustrated in FIG. 14, the robot 1 is connected to a cloud server 3. A girl 1401 as the user asks "What is this?" while presenting a toy bear 1402 to the front of the robot 1. Then, in response to the speech of the user 1401, the robot 1 determines that the user 1401 requests the robot to recognize the object, and takes an image of the recognition target object (Step ST1).

Next, the robot 1 transmits the taken image of the recognition target object to the cloud server 3 (Step ST2). Next, the cloud server 3 executes the image recognition processing to recognize the object included in the transmitted image as the toy animal 1402 (Step ST3). Next, the cloud server 3 transmits an image recognition result to the robot 1, and the robot 1 receives the image recognition result (Step ST4). Next, since the image recognition result is "toy animal", the robot 1 speaks "toy animal" (Step ST5).

Since the image recognition processing takes about 15 to 30 seconds to transmit the image and receive the recognition result, if the robot 1 takes no action for the period, the user 1401 worries about whether the robot 1 accepts the request of the image recognition processing or the robot 1 is out of order. Thus, the present disclosure adopts a following aspect.

Figure 15:
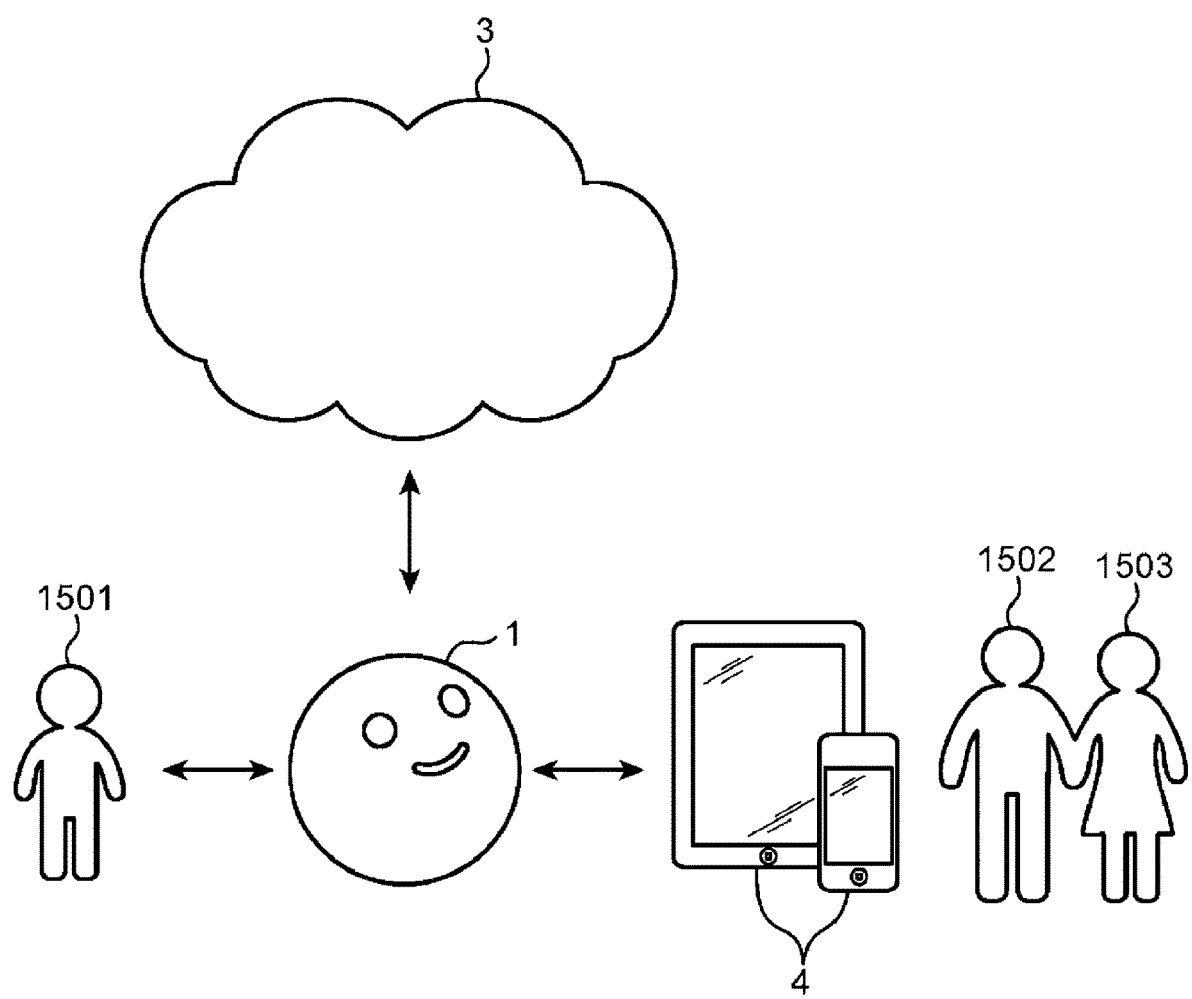
FIG. 15 is a view illustrating exemplary overall configuration of a robot system using the robot according to the first embodiment of the present disclosure.

Next, an exemplary overall configuration of a robot system 1500 using the robot 1 according to the first embodiment of the present disclosure will be described with reference to FIG. 15. FIG. 15 is a view illustrating the exemplary overall configuration of the robot system 1500 using the robot 1 according to the first embodiment of the present disclosure. The robot system 1500 includes the cloud server 3, a portable terminal 4, and the robot 1. The robot 1 is connected to the Internet via Wifi (registered trademark), and to the cloud server 3. The robot 1 is also connected to the portable terminal 4 via Wifi (registered trademark), for example. As an example, a user 1501 is a child, and users 1502, 1503 are parents of the child.

For example, an application cooperating with the robot 1 is installed in the portable terminal 4. The portable terminal 4 can issue various instructions to the robot 1 using the application, and display the image recognition result described referring to FIG. 14.

When receiving a request to read a picture book to the child from the portable terminal 4, the robot 1 reads the picture book aloud to the child. When accepting a question during reading of the picture book, the robot 1 transmits the question to the cloud server 3, receives an answer to the question from the cloud server 3, and speaks the answer.

As described above, the user 1501 can treat the robot 1 like a pet, and learn language through communication with the robot 1.

Next, details of an internal circuit of the robot 1 according to the first embodiment of the present disclosure will be described with reference to FIG. 16. FIG. 16 is a block diagram illustrating the robot 1 according to the first embodiment of the present disclosure, and the cloud server 3 (an example of an external server) connected to the robot 1.

As illustrated in FIG. 16, the robot 1 includes the control circuit 201, a communication unit 220, a display unit 206, the third drive mechanism 207, a third drive mechanism control unit 208, the second drive mechanism 209, a second drive mechanism control unit 210, the first drive mechanism 211, a first drive mechanism control unit 212, the speaker 218, the camera 104, and the microphone 215.

The control circuit 201 includes a main control unit 202, a voice recognition processing unit 203, a face recognition processing unit 204, a display information output control unit 205, a voice information output control unit 217, and a memory 213. The control circuit 201 is configured of a computer including a processor such as CPU.

The main control unit 202 acquires a recognition result of the user's voice from the voice recognition processing unit 203. The main control unit 202 acquires a recognition result of the user's face from the face recognition processing unit 204.

The main control unit 202 generates a command based on information acquired from the voice recognition processing unit 203 and the face recognition processing unit 204, and transmits the command to the voice information output control unit 217, the display information output control unit 205, the third drive mechanism control unit 208, the second drive mechanism control unit 210, and the first drive mechanism control unit 212, and so on. Details of the command will be described later.

The voice recognition processing unit 203 recognizes presence/absence of the user's voice in the voice acquired by the microphone 215, and stores the voice recognition result in the memory 213 to manage the voice recognition result. The voice recognition processing unit 203 compares voice recognition data stored in the memory 213 with the acquired voice to recognize the speech content. The microphone 215 converts sound into an electric signal, and outputs the electric signal to the voice recognition processing unit 203.

The face recognition processing unit 204 recognizes presence/absence, position, and size of the user's face from video acquired by the camera 104, and stores the face recognition result in the memory 213 to manage the face recognition result. As described above, the camera 104 is provided at least one of the first spherical cap portion 102 and the second spherical cap portion 103 which are driven independently from the main housing 101. The camera 104 can be directed to the front in the advancing direction of the robot 1 by rotating the first spherical cap portion 102 and the second spherical cap portion 103 using the third drive mechanism 207 to rotate the main housing 101 using the second drive mechanism 209. Thereby, the camera 104 can take an image of a recognition target object presented to the front of the robot 1.

According to a command from the main control unit 202, the display information output control unit 205 allows the display unit 206 to display information displaying the facial expressions of the robot 1. The display unit 206 is configured of the first display unit 105, the second display unit 106, and the third display unit 107, which are described with reference to FIG. 2.

The voice information output control unit 217 outputs voice corresponding to a command from the main control unit 202 via the speaker 218, enabling the robot 1 to speak. The speaker 218 converts an electric signal of the voice into physical vibrations.

The memory 213 is configured of, for example, a non-volatile rewritable storage device that stores a program for controlling the robot 1 and so on.

According to a command from the main control unit 202, the third drive mechanism control unit 208 operates the third drive mechanism 207 of the robot 1. The third drive mechanism 207 is configured of the shaft 112, the first gear 122 (FIG. 8), the drive belt 113, the second gear 123 (FIG. 8), the first motor 114, and the frame 115, which are described with reference to FIG. 4. The third drive mechanism control unit 208 and the third drive mechanism 207 correspond to an example of the third drive mechanism.

According to the command from the main control unit 202, the second drive mechanism control unit 210 operates the second drive mechanism 209 of the robot 1. The second drive mechanism 209 is configured of the third gear 116, the fourth gear 117, the second motor 118, and the frame 115, which are described with reference to FIG. 4. The second drive mechanism control unit 210 and the second drive mechanism 209 correspond to an example of the second drive mechanism.

According to the command from the main control unit 202, the first drive mechanism control unit 212 operates the first drive mechanism 211 of the robot 1. The first drive mechanism 211 is configured of the third arm 119, the fourth arm 120, the third motor 121, and the driven shaft 139, which are described with reference to FIGS. 6 and 7. The first drive mechanism control unit 212 and the second drive mechanism 211 correspond to an example of the first drive mechanism.

The communication unit 220 is configured of a communication device that connects the robot 1 to the cloud server 3. The communication unit 220 includes, but is not limited to, a communication device having a wireless LAN function such as Wifi (registered trademark). The communication unit 220 is an example of a communication circuit.

The cloud server 3 is connected to the robot 1 via the Internet (an example of external network). The cloud server 3 includes a communication unit 301 and a processing unit 302. The communication unit 301 is configured of a communication device that connects the cloud server 3 to the Internet. In response to a request from the robot 1, the processing unit 302 executes various types of processing, and transmits processing results to the robot 1 via the communication unit 301.

Figure 17:
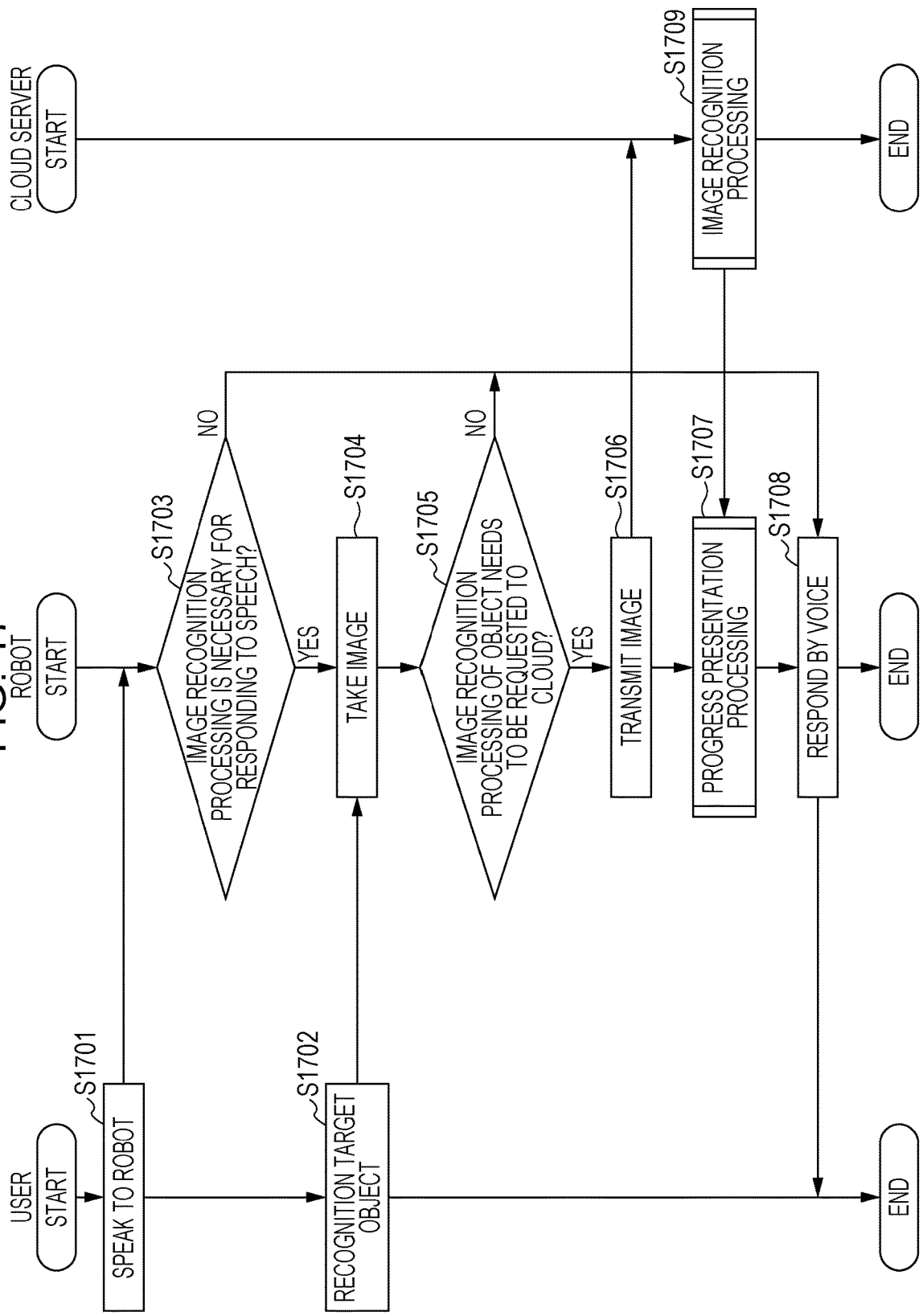
FIG. 17 is a flow chart illustrating image recognition processing in the robot according to the first embodiment of the present disclosure.

Next, image recognition processing in the robot 1 according to the first embodiment of the present disclosure will be described with reference to FIG. 17. FIG. 17 is a flow chart illustrating the image recognition processing in the robot 1 according to the first embodiment of the present disclosure. In this processing, for the period during which the robot 1 requests the cloud server 3 to execute the image recognition processing, and receives an image recognition result, the robot 1 swings side-to-side as if it is thinking.

First, the user speaks to the robot 1 (S1701). For example, as described with reference to FIG. 14, the user presents the toy animal 1402 to the robot 1, and speaks "What is this?".

Next, the voice recognition processing unit 203 of the robot 1 determines whether or not the image recognition processing is necessary for responding to the speech (S1703). Here, the memory 213 previously stores one or more pieces of speech reference data indicating a characteristic value of speech that requires the image recognition processing. Thus, the voice recognition processing unit 203 may determine that the image recognition processing is necessary when the similarity between the characteristic value of the user's voice and any speech reference data stored in the memory 213 is a threshold value or more.

Examples of the speech that requires the image recognition processing include an inquiry of the recognition target object such as "What is this?" and a command such as "Execute image recognition processing". In order to answer a question "How many?" made by the user presenting a fist with two fingers, i.e., the index and middle fingers extended, the question "How many?" may be adopted as the speech that requires the image recognition processing.

If it is determined that the image recognition processing is necessary for response in S1703 (YES in S1703), the processing proceeds to S1704. If it is determined that the image recognition processing is not necessary (NO in S1703), the processing proceeds to S1708.

Next, the camera 104 takes an image including the recognition target object (S1702, S1704). The voice recognition processing unit 203 notifies the main control unit 202 that the image recognition processing, and when receiving the notification, the main control unit 202 transmits a command to rotate the shaft 112 such that the imaging direction of the camera 104 is directed in the advancing direction of the robot 1, to the third drive mechanism control unit 208 (FIG. 16).

Here, the main control unit 202 may acquire a rotation count of the second motor 118 (FIG. 4) from an encoder not illustrated in the second drive mechanism control unit 210 (FIG. 16), and the rotation count of the first motor 114 from an encoder not illustrated in the third drive mechanism control unit 208, and based on the two acquired rotation counts, calculate the rotation count of the shaft 112 required to match the imaging direction of the camera 104 with the advancing direction of the robot 1. Then, the main control unit 202 may transmit the calculated rotation count and a command to rotate the shaft 112 to the third drive mechanism control unit 208.

After the main control unit 202 matches the imaging direction of the camera 104 with the advancing direction of the robot 1, the main control unit 202 may transmit an imaging command to the face recognition processing unit 204, allowing the camera 104 to take an image of the recognition target object.

If it is determined that the image recognition processing of the voice recognition processing unit 203 is necessary, the main control unit 202 may send a message "Place an object you want to identify in front of the robot" to the voice information output control unit 217, and outputs the message via the speaker 218. Thereby, the robot 1 can cause the user to place the recognition target object in front of the robot 1, preventing the situation where the recognition target object is out of the imaging range of the camera 104.

Next, the main control unit 202 determines whether or not the image recognition processing of the image taken in S1704 needs to be requested to the cloud server 3 (S1705). If the main control unit 202 determines that the image recognition processing needs to be requested (YES in S1705), the communication unit 220 transmits the image taken in S1704 to the cloud server 3 (S1706). In contrast, if the main control unit 202 determines that the image recognition processing does not need to be requested (NO in S1705), the processing proceeds to S1708.

Here, the memory 213 previously stores recognition unnecessariness reference data indicating a characteristic value of a reference image that does not need to request the image recognition processing. Accordingly, the main control unit 202 may determine that the image recognition processing does not need to be requested if the similarity between the characteristic value of the image taken in S1704 and the recognition unnecessariness reference data is a threshold value or more, and determine that the image recognition processing needs to be requested if the similarity between the characteristic value of the image taken in S1704 and the recognition unnecessariness reference data is less than the threshold value.

Examples of the reference image include an image of the user's face. The image of the user's face may include an image of a child who mainly handles the robot 1 and images of a family of the child. This is due to that, for each of the frequently-executed processing of recognizing the user's face, when the image recognition processing is requested to the cloud server 3, the user must wait for a long time, excessively increasing a stress on the user. An image in which the user extends at least one fingers, for example, one finger or two fingers may be adopted as the reference image.

Next, the robot 1 executes progress presentation processing until the robot 1 receives the image recognition result (S1707). Details of the progress presentation processing will be described later.

When the image recognition processing needs to be requested to the cloud server 3, it takes a predetermined time or more to acquire the image recognition result. In this case, when the robot 1 takes no action, the user may determine that the robot 1 is out of order. Thus, in this embodiment, if image recognition processing needs to be requested to the cloud server 3, the progress presentation processing described later is executed (S1707).

Next, the cloud server 3 executes the image recognition processing (S1709). Details of the image recognition processing will be described later.

When receiving the image recognition result, the robot 1 finishes the progress presentation processing.

Next, the voice information output control unit 217 outputs the image recognition result via the speaker 218, and speaks the image recognition result as an answer (S1708). In this case, the voice information output control unit 217 outputs a voice representing, for example, a name of the recognition target object via the speaker 218. For example, when the toy animal 1402 is recognized as illustrated in FIG. 14, the speaker 218 audibly outputs "toy animal".

The processing in S1708 executed if NO is selected in S1703 or NO is selected in S1705 is as follows. For example, when the robot 1 makes a dialogue with the user, it is determined that the image recognition processing is not necessary for responding to speech (NO in S1703). In this case, in S1708, the voice information output control unit 217 may output a voice corresponding to conversation with the user via the speaker 218.

For example, when the user's name is inquired to robot 1, or the user shows his/her finger and asks "How many?", it is determined that the image recognition processing of the image taken in S1704 does not need to be requested to the cloud server 3 (NO in S1705). In this case, in S1708, the voice information output control unit 217 may output a voice representing the user's name or "Two" via the speaker 218.

Figure 18:
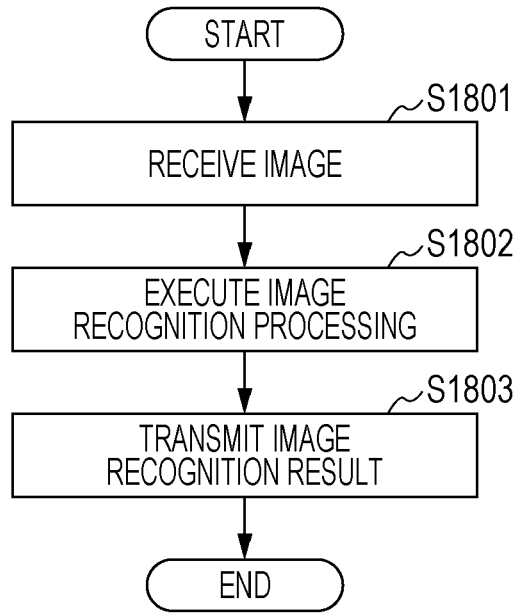
FIG. 18 is a flow chart illustrating details of image recognition processing illustrated in S1709 in FIG. 17 in the first embodiment of the present disclosure.

FIG. 18 is a flow chart illustrating details of image recognition processing illustrated in S1709 in FIG. 17 in the first embodiment of the present disclosure. First, the communication unit 301 receives an image from the robot 1 (S1801).

Next, the processing unit 302 executes the image recognition processing (S1802). For example, in the use case illustrated in FIG. 14, the image including the toy animal 1402 is subjected to the image recognition processing. The processing unit 302 includes an object model database in which characteristic values of object's images are acquired by machine learning and associated with respective object's names. The processing unit 302 may extract the characteristic value from an image transmitted from the robot 1, compare the extracted characteristic value with the characteristic values of the objects registered in the object model database, and determine that the object having the highest similarity as the recognition target object. In the example illustrated in FIG. 14, "toy animal" is the image recognition result.

Next, the communication unit 301 transmits the image recognition result of the processing unit 302 to the robot 1 (S1803).

Figure 19:
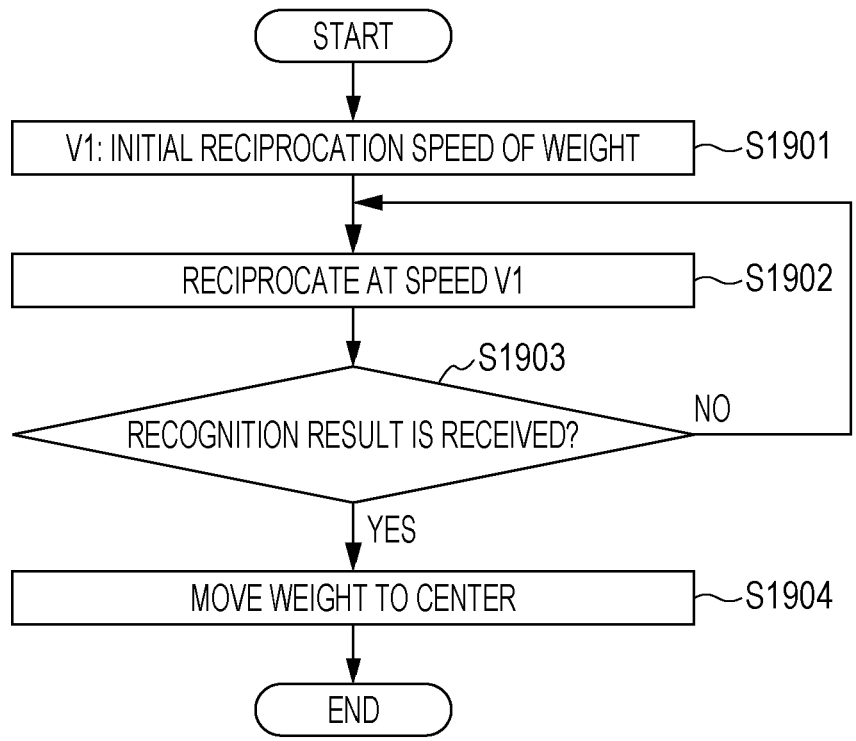
FIG. 19 is a flow chart illustrating details of progress presentation processing illustrated in S1707 in FIG. 17 in the first embodiment of the present disclosure.

Next, details of the progress presentation processing illustrated in S1707 in FIG. 17 in the first embodiment of the present disclosure will be described. The progress presentation processing in the first embodiment is characterized by that the weight 111 is moved to left or right at a certain speed and for a certain time until the image recognition result is received, reciprocating the weight 111. FIG. 19 is a flow chart illustrating details of the progress presentation processing illustrated in S1707 in FIG. 17 in the first embodiment of the present disclosure.

First, the main control unit 202 transmits a command to designate an initial reciprocation speed V1 of the weight to the first drive mechanism control unit 212 (S1901). The initial reciprocation speed V1 of the weight is an initial value of the speed at which the weight 111 is moved to left (the arrow 133 in FIG. 13B) and right (the arrow 135 in FIG. 13C), and is stored in the memory 213 in advance.

Next, the first drive mechanism control unit 212 accepts the command to designate the initial reciprocation speed V1 of the weight from the main control unit 202, and moves the weight 111 to left or right at the initial reciprocation speed V1 of the weight for a certain time to reciprocate the weight 111 (S1902).

Specifically, in the processing in S1902, first, the first drive mechanism control unit 212, as illustrated in FIG. 13A, moves the weight 111 to the central position in the lateral direction. Then, the third motor 121 (FIG. 7) is driven at the rotational speed corresponding to the initial reciprocation speed V1 of the weight. When a predetermined time (hereinafter referred to as predetermined time T0) elapses from start of driving of the third motor 121 (FIG. 7), the first drive mechanism control unit 212 reverses the rotating direction of the third motor 121 (FIG. 7). Then, each time a time 2T0 that is twice of the predetermined time T0 (hereinafter referred to as certain time 2T0) elapses, the first drive mechanism control unit 212 reverses the rotating direction of the third motor 121 (FIG. 7).

Next, if the communication unit 220 does not receive the image recognition result (NO in S1903), the main control unit 202 returns the processing to S1902, and executes the processing in S1902. In this manner, the control circuit 201 reciprocates the weight 111 until the image recognition result is received. Thereby, until the image recognition result is received, the robot 1 can repeatedly swing side-to-side to notify the user that the image recognition processing is being executed.

In contrast, if the communication unit 220 receives the image recognition result (YES in S1903), the first drive mechanism control unit 212 accepts a command to move the weight 111 to the central position in the lateral direction from the main control unit 202 and, as illustrated in FIG. 13A, moves the weight 111 to the central position in the lateral direction (S1904). Thereby, the robot 1 stops side-to-side swinging, and returns to the default position. As a result, the weight 111 returns to the default state such that the robot 1 can rapidly respond to the next operation.

As described above, in this embodiment, when the robot 1 needs the predetermined time for response to the users question or more, the robot 1 swings side-to-side with a mouth or nose facing forward. This motion expresses the state where the robot 1 swings its body side-to-side while thinking deeply.

Therefore, even the spherical robot 1 including no hand or leg, and having the constraints in notifying the user of the progress state in internal processing can inform the user that the robot 1 is under processing, during the dialogue with the user by utilizing the movement of the weight 111 without displaying the indication of the in-process state on the surface of the spherical robot 1. Consequently, just by viewing the external appearance of the robot 1, the user can determine whether the robot 1 is under processing or out of order.

In this embodiment, when the image recognition result is received, the weight 111 is returned to the default central position in the lateral direction (S1904). In this embodiment, this can prevent the robot 1 from unnaturally swinging side-to-side during response due to the swinging in the image recognition processing.

Second Embodiment

A second embodiment is characterized by that the speed at which the weight 111 reciprocates is decreased as the image recognition processing progresses. The same components in the second embodiment as those in the first embodiment are given the same reference numerals, and description thereof is omitted.

The overall processing in the second embodiment is the same as the processing illustrated in FIG. 17 except for S1709 and S1707.

Figure 20:
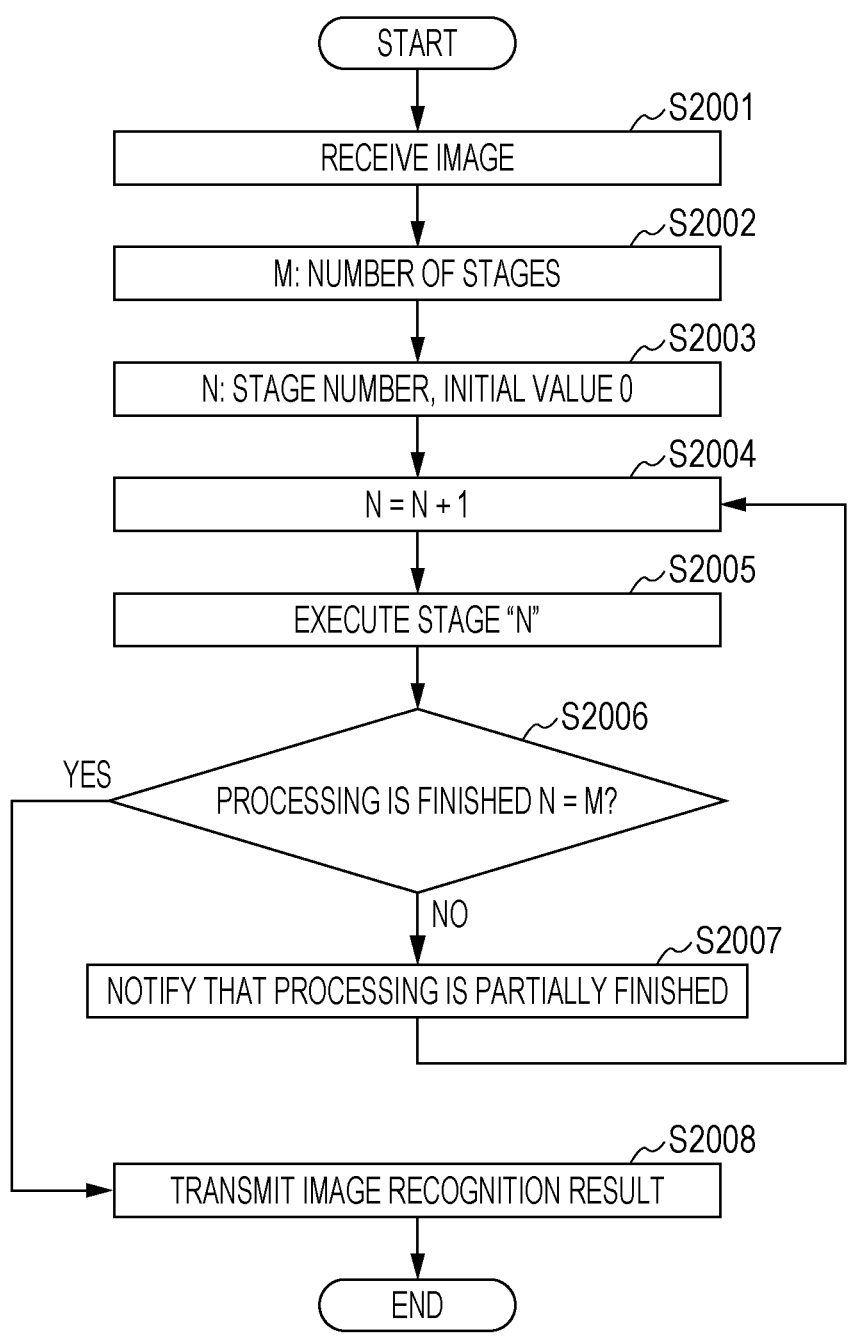
FIG. 20 is a flow chart illustrating details of image recognition processing illustrated in S1709 in FIG. 17 in a second embodiment of the present disclosure.

FIG. 20 is a flow chart illustrating details of image recognition processing illustrated in S1709 in FIG. 17 in the second embodiment of the present disclosure. S2001, S2008 are the same as S1801, S1803 in FIG. 18, respectively, and thus description thereof is omitted.

In S2002, the processing unit 302 prepares a parameter that prescribes the number of stages M required in the image recognition processing. Here, the number of stages M is previously prescribed according to contents of the image recognition processing adopted by the cloud server 3. For example, when the cloud server 3 adopts the image recognition processing including three stages, M is set to 3.

In S2003, the processing unit 302 set a stage number N to an initial value "0". The stage number N is a number that identifies the stage under processing.

In S2004, the processing unit 302 increments the stage number N by 1.

In S2005, the processing unit 302 executes the image recognition processing of the stage number N.

In S2006, the processing unit 302 determines whether or not the stage number N reaches the number of stages M. If the stage number N reaches the number of stages M (YES in S2006), the processing unit 302 can acquire the image recognition result, and proceeds the processing to S2008.

If the stage number N does not reach the number of stages M (NO in S2006), the processing unit 302 causes the communication unit 220 to notify the robot 1 that the image recognition result is partially finished (S2007). At this time, the processing unit 302 transmits the processed stage number N and the number of stages M to the robot 1.

When the processing in S2007 is finished, the processing returns to S2004. Then, the image recognition processing of the next stage number N is executed.

Figure 21:
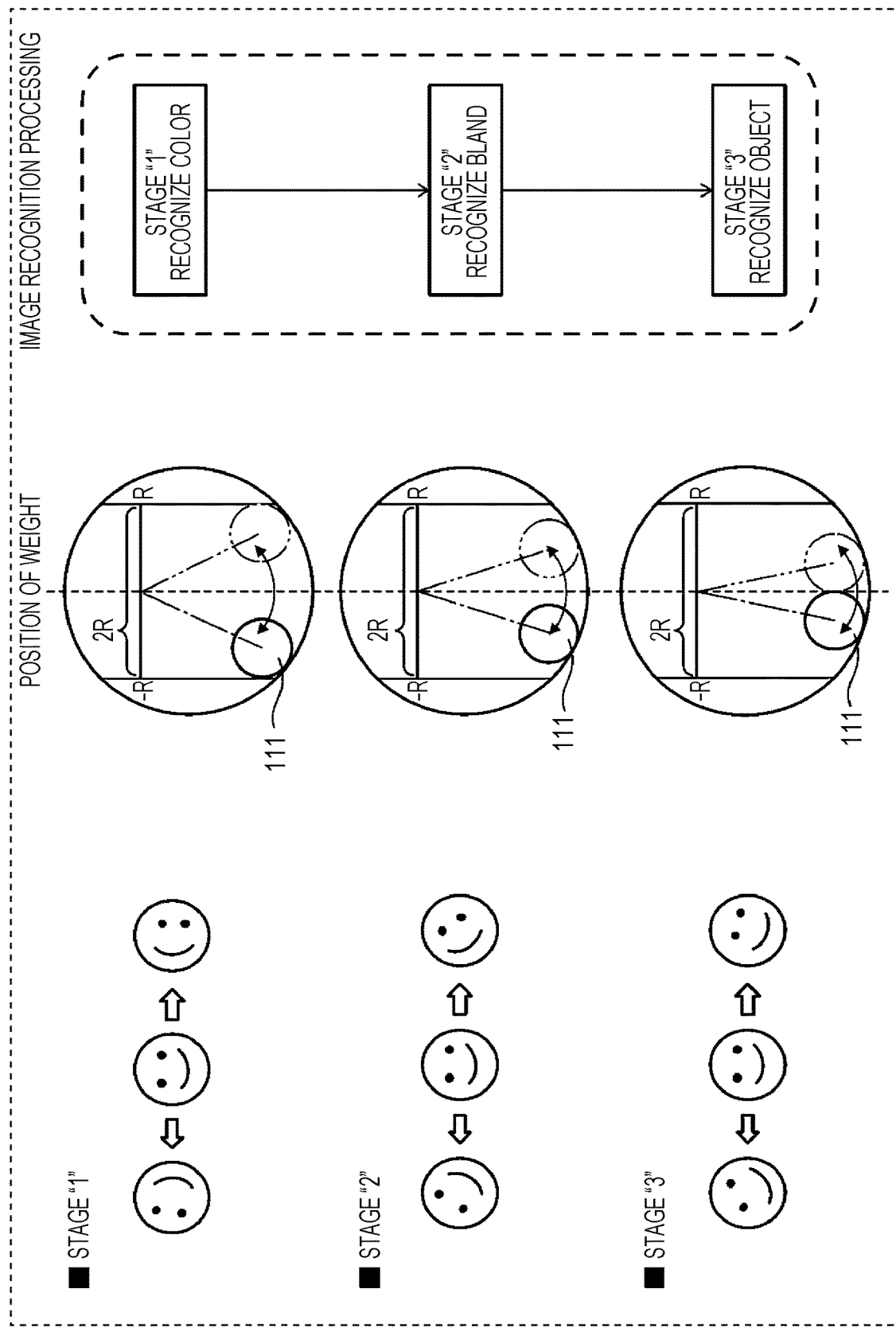
FIG. 21 is a view illustrating relationship between the position of the weight and stages indicated by stage number of the image recognition processing.

Next, the stages of the image recognition processing will be described. FIG. 21 is a view illustrating an example of stages indicated by the stage number N of the image recognition processing. In the example illustrated in FIG. 21, the image recognition processing is configured of three stages "1", "2", and "3" indicated by the stage number N=1, 2, 3, respectively.

The stage "1" is the stage that recognizes color of the recognition target object, the stage "2" is the stage that recognizes bland of the recognition target object, and the stage "3" is the stage that finally recognizes what is the recognition target object.

Assuming that the recognition target object is a commercially available soft drink, in the stage "1", color of the soft drink is recognized. For example, in the case of water, the recognition result is "transparent". The processing unit 302 may extract the recognition target object from an image transmitted from the robot 1, and analyze color of the extracted recognition target object to recognize color of the recognition target object. The recognition target object may have a plurality of colors. In this case, the processing unit 302 sets some colors that occupy a certain proportion or more as the recognition result.

In the stage "2", the processing unit 302 recognizes, for example, characters on a label of a bottle of the soft drink to recognize a brand name. When a product name "XXX" is described on the label of the bottle of the soft drink, the recognition result is "XXX".

In the stage "3", the processing unit 302 finally recognizes what is the recognition target object, for example, using the above-mentioned object model database. When the soft drink is recognized, the recognition result is "soft drink". Here, when the type of the soft drink can be recognized, the recognition result is "soft drink: water".

Figure 22:
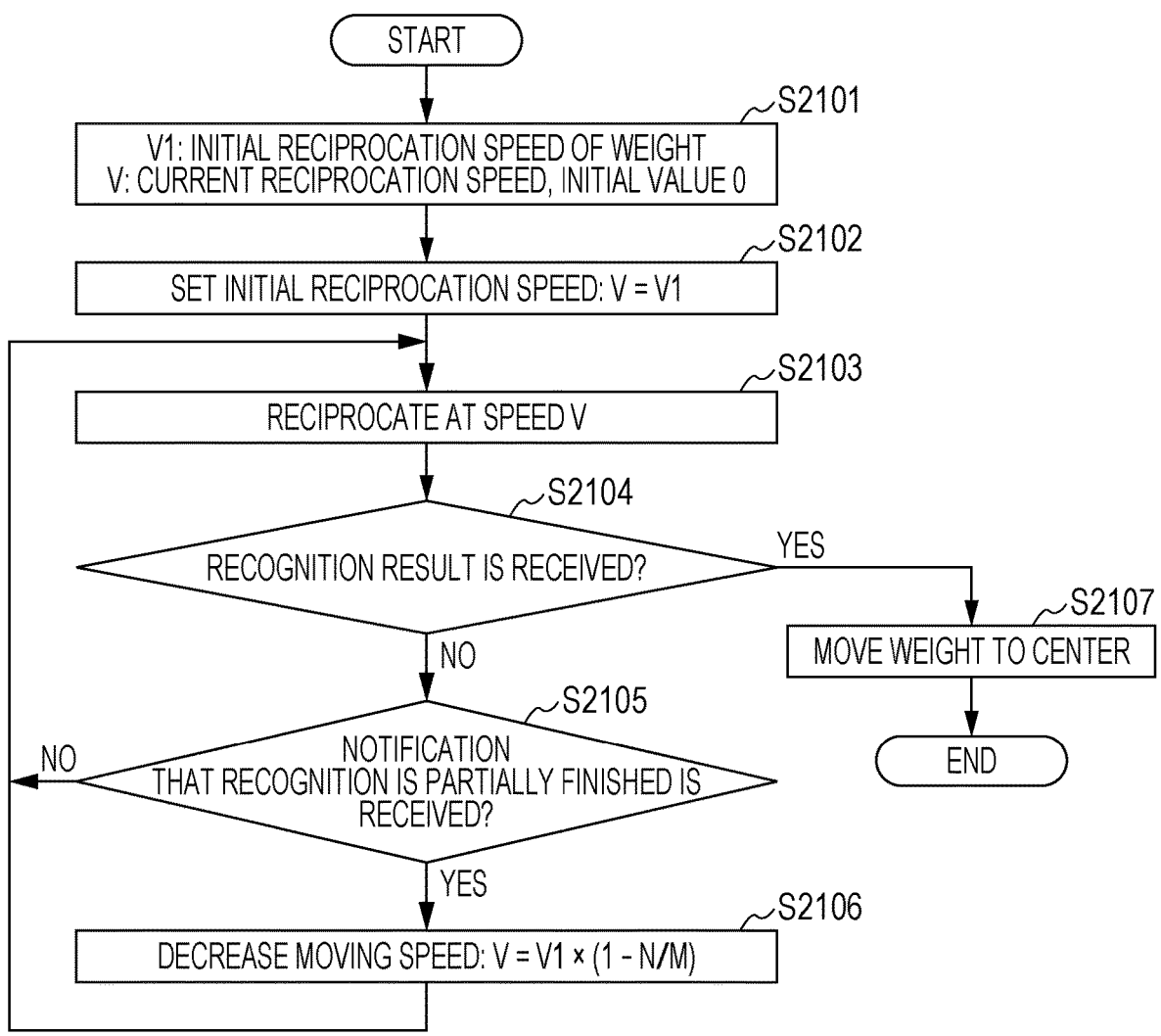
FIG. 22 is a flow chart illustrating details of progress presentation processing illustrated in S1707 in FIG. 17 in the second embodiment of the present disclosure.

FIG. 22 is a flow chart illustrating details progress presentation processing illustrated in S1707 in FIG. 17 in the second embodiment of the present disclosure.

S2104, S2107 in FIG. 22 are the same as S1903, S1904 in FIG. 19, respectively, and thus, description thereof is omitted.

First, the main control unit 202 prepares the initial reciprocation speed V1 of the weight and a parameter specifying current reciprocation speed V (S2101). As described above, the initial reciprocation speed V1 of the weight is the initial value of the speed at which the weight 111 is moved to left or right, and is stored in the memory 213 in advance. In the processing in S2101, the main control unit 202 reads the initial reciprocation speed V1 of the weight from the memory 213. The current reciprocation speed V is the parameter that specifies the speed at which the weight 111 is actually moved to left or right, and is initially set to "0".

Next, the main control unit 202 sets the current reciprocation speed V to the initial reciprocation speed V1 of the weight (V=V1), and transmits a command to designate the set current reciprocation speed V to the first drive mechanism control unit 212 (S2102).

Next, the first drive mechanism control unit 212 accepts the command to designate the current reciprocation speed V from the main control unit 202, and as in the processing in S1902 (FIG. 19), moves the weight 111 to right or left at the current reciprocation speed V for the certain time 2T0 to reciprocate the weight 111 (S2103).

S2105 is the processing in which the robot 1 receives the notification that the image recognition processing is partially finished, which is sent from the cloud server 3 in S2007 in FIG. 20. In S2105, if the communication unit 220 does not receive the notification that the image recognition processing is partially finished from the cloud server 3 (NO in S2104), the main control unit 202 returns the processing to S2103. In contrast, if the communication unit 220 receives the notification that the image recognition processing is partially finished from the cloud server 3 (YES in S2104), the main control unit 202 proceeds the processing to S2106. In S2104, the robot 1 receives the processed stage number N and the number of stages M.

In S2106, using the processed stage number N and the number of stages M which are received in S2104, the main control unit 202 sets the current reciprocation speed V to V1×(1−N/M). For example, when the stage "1" is finished, the robot 1 receives N=1 in S2104. Thus, during processing of the stage "2", the current reciprocation speed V is set to V1×(1−1/M).

In this manner, the main control unit 202 decreases the current reciprocation speed V by one step each time the stage of the image recognition processing progress by one step.

In the example illustrated in FIG. 21, during processing of the stage "1",the main control unit 202 sets the current reciprocation speed V to the initial reciprocation speed V1 of the weight. In this case, the weight 111 moves to left at the initial reciprocation speed V1 of the weight for the certain time 2T0, so as to move by an amplitude "2R" from a position "R" represented by a broken line to a position "−R" represented by a solid line in FIG. 21, which corresponds to "V1×2T0". Accordingly, the robot 1 moves with the amplitude "2R" for the certain time 2T0 from the rightward tilted state by about 90 degrees to the leftward tilted state by about 90 degrees.

In this case, when the processing of the stage "1" is finished, the main control unit 202 sets the current reciprocation speed V to V1×2/3 (=1−1/3). Thus, during processing of the stage "2", the weight 111 moves with the amplitude "R×4/3 (=2R×2/3)" corresponding to "V1×2/3×2T0", at the speed "V1×2/3" for the certain time 2T0. As a result, the robot 1 moves with the amplitude "4R/3" for the certain time 2T0 from the rightward tilted state by about 60 degrees to the leftward tilted state by about 60 degrees.

When the processing of the stage "2" is finished, the main control unit 202 sets the current reciprocation speed V to V1×1/3 (=1−2/3). Thus, during processing of the stage "3", the weight 111 moves with the amplitude "R×2/3 (=2R×1/3)" corresponding to "V1×1/3×2T0", at the speed "V1×1/3" for the certain time 2T0. As a result, the robot 1 moves with the amplitude "2R/3" for the certain time 2T0 from the rightward tilted state by about 30 degrees to the leftward tilted state by about 30 degrees.

As described above, in this embodiment, since the moving speed of the weight 111 is decreased as the stage of the image recognition processing progresses, the progress of the image recognition processing can be informed to the user through the motion of the robot 1.

Modification Example 1

Figure 23:
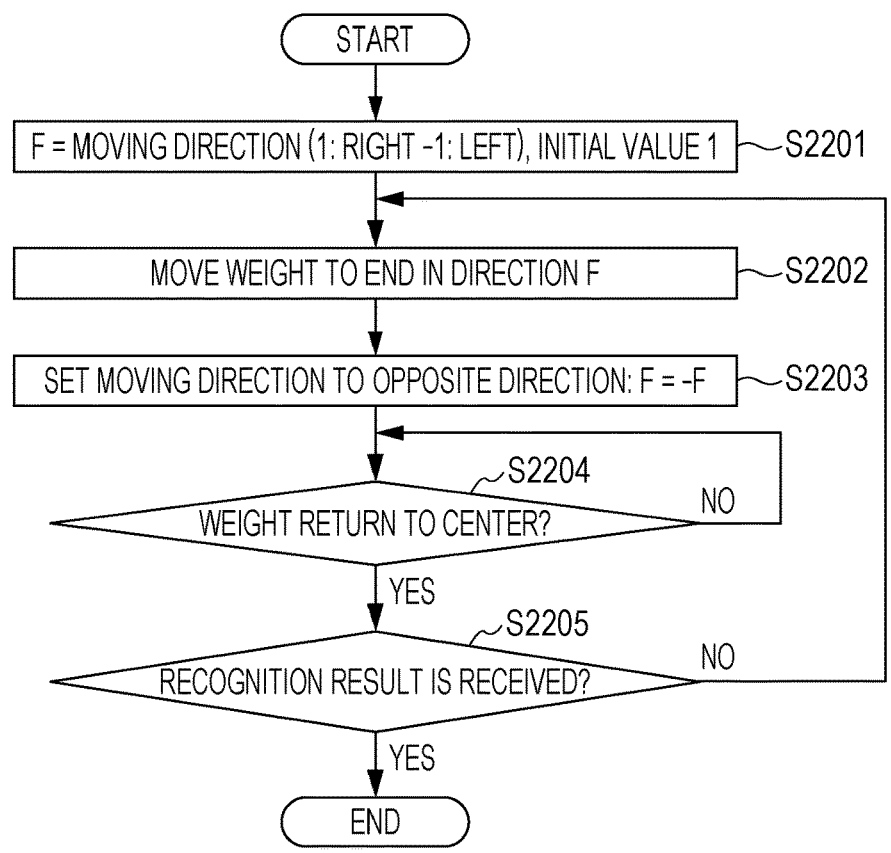
FIG. 23 is a flow chart illustrating a modification example of the progress presentation processing illustrated in S1707 in FIG. 17 in the first embodiment of the present disclosure.
Figure 24:
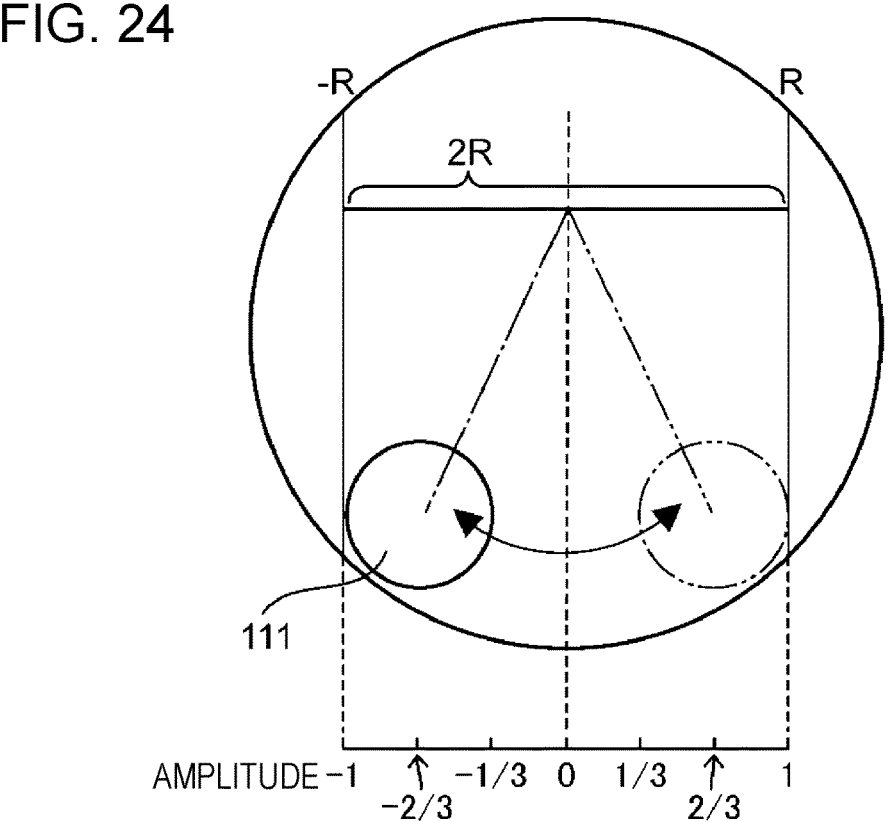
FIG. 24 is a schematic view illustrating the position of the weight.

The progress presentation processing illustrated in S1707 in FIG. 17 in the first embodiment may be executed in processing flow illustrated in FIG. 23 in place of the processing flow illustrated in FIG. 19. The processing flow illustrated in FIG. 23 will be described below in detail. FIG. 23 is a flow chart illustrating details of a modification example of the progress presentation processing illustrated in S1707 in FIG. 17 in the first embodiment of the present disclosure. FIG. 24 is a schematic view illustrating the position of the weight 111.

The progress presentation processing illustrated in FIG. 19 in the first embodiment is characterized by that the weight 111 is moved to left or right at the certain speed (the initial reciprocation speed V1 of the weight) every certain time 2T0 to reciprocate the weight 111, until the image recognition result is received. However, the progress presentation processing illustrated in FIG. 23 is characterized by that the weight 111 is moved from the central position at a certain speed, and when the weight 111 reaches a predetermined position, the moving direction is reversed and then, then when the weight 111 returns to the central position, the reciprocation of the weight 111 is finished or continued depending on whether or not the image recognition result is received.

As illustrated in FIG. 23, first, the main control unit 202 transmits a command to designate a moving direction F to the first drive mechanism control unit 212 (S2201). Referring to FIG. 24, the moving direction F is a parameter that specifies whether the weight 111 is moved to left or right with respect to the central position in the lateral direction that is the center of a moving range 2R of the weight 111. The center of the moving range 2R is set to 0. The moving direction F has a value of "1" when the weight 111 is moved to right with respect to the center of the moving range 2R, and has a value of "−1" when the weight 111 is moved to left with respect to the center of the moving range 2R. The initial value of the moving direction F may be set to, but is not limited to, "1", and may be set to "−1".

Next, the first drive mechanism control unit 212 accepts the command to designate the moving direction F from the main control unit 202, and moves the weight 111 to the end in the moving direction F at a predetermined speed (hereinafter referred to as predetermined speed V0) (S2202). Specifically, in the processing in S2202, the first drive mechanism control unit 212 acquires a rotation count of the third motor 121 (FIG. 7) from a built-in encoder not illustrated. The first drive mechanism control unit 212 rotates the third motor 121 (FIG. 7) at the rotational speed corresponding to the predetermined speed V0 in the moving direction F, until the acquired rotation count becomes the rotation count acquired when the weight 111 is located at the end "R" or "−R" in the moving direction F (FIG. 24). The predetermined speed V0 may be set to the above-mentioned initial reciprocation speed V1 as appropriate.

When the processing in S2202 is finished, the main control unit 202 sets the moving direction F to "−F", and transmits a command to designate the set moving direction F to the first drive mechanism control unit 212 (S2203). Thereby, the main control unit 202 reverses the moving direction F of the weight 111. During the processing in S2202, the main control unit 202 acquires a rotation count of the third motor 121 (FIG. 7) from the encoder built in the first drive mechanism control unit 212. Then, the main control unit 202 determines that the processing in S2202 is finished when the acquired rotation count becomes the rotation count acquired when the weight 111 is located at the end "R" or "−R" in the moving direction F (FIG. 24), and executes processing in S2203.

Then, when the weight 111 returns to the central position in the lateral direction (YES in S2404), if the communication unit 220 receives the image recognition result from the cloud server 3 (YES in S2205), the main control unit 202 finishes the progress presentation processing. As described above, when the weight 111 returns to the central position in the lateral direction, if the communication unit 220 receives the image recognition result, the control circuit 201 finishes the progress presentation processing. This can prevent the robot 1 from unnaturally responding while swinging side-to-side. In S2404, based on that rotation count acquired from a built-in encoder not illustrated corresponds to the rotation count acquired when the weight 111 is located at the central position in the lateral direction, the main control unit 202 may determine that the weight 111 returns to the central position in the lateral direction.

If the communication unit 220 does not receive the image recognition result (NO in S2205), the main control unit 202 returns the processing to S2202, and executes the processing in S2202 and subsequent steps. In this manner, when the weight 111 returns to the central position in the lateral direction, if the communication unit 220 does not receive the image recognition result, the main control unit 202 allows the weight 111 to reciprocate about the central position in the lateral direction. As a result, the robot 1 can continue to swing side-to-side until the image recognition result is received, to notify the user that the image recognition processing is being executed.

Modification Example 2

Figure 25:
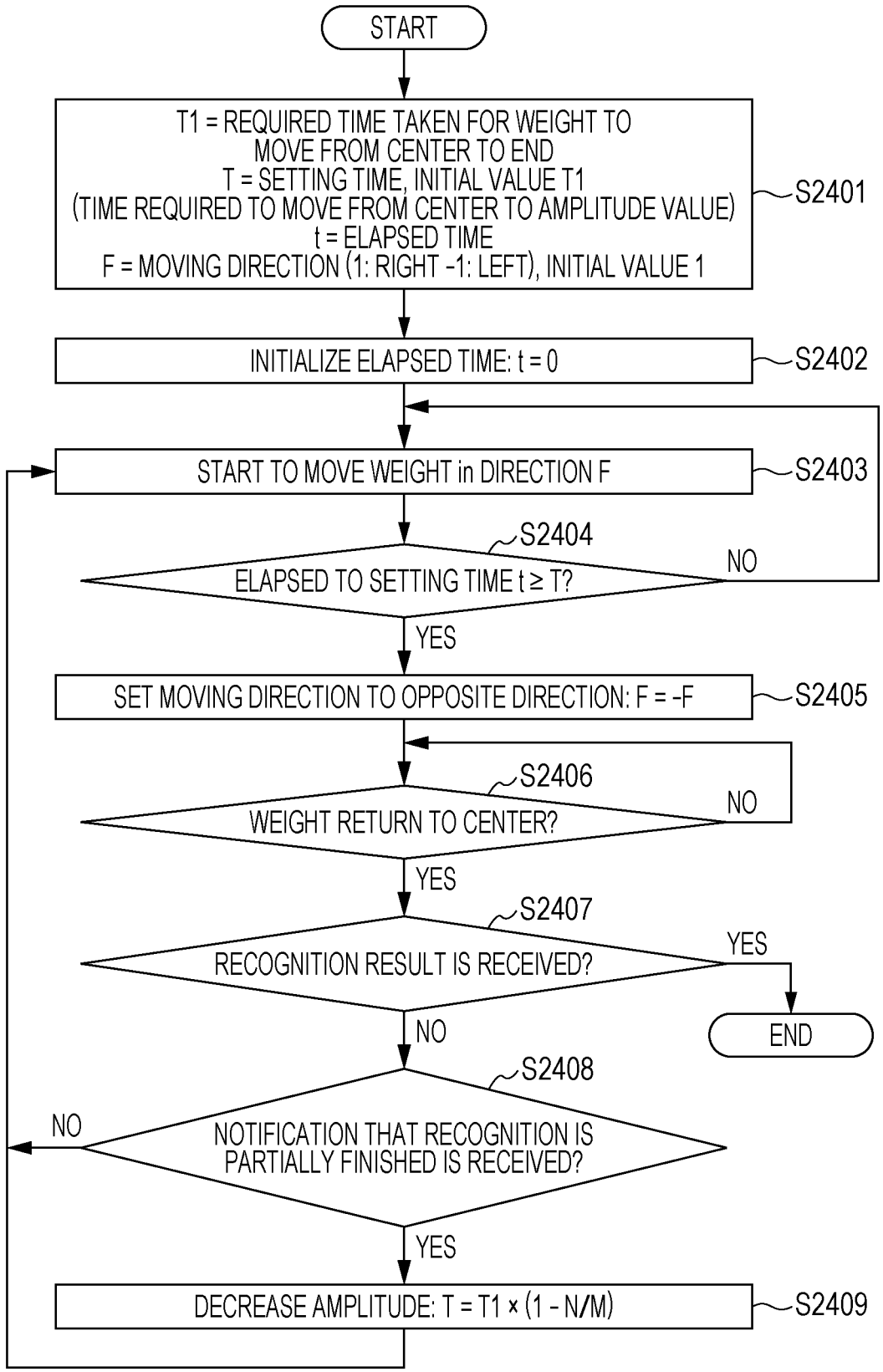
FIG. 25 is a flow chart illustrating a modification example of the progress presentation processing illustrated in S1707 in FIG. 17 in the second embodiment of the present disclosure.

The progress presentation processing illustrated in S1707 in FIG. 17 in the second embodiment may be executed in processing flow illustrated in FIG. 25 in place of the processing flow illustrated in FIG. 22. The processing flow illustrated in FIG. 25 will be described below in detail. FIG. 25 is a flow chart illustrating details of a modification example of the progress presentation processing illustrated in S1707 in FIG. 17 in the second embodiment of the present disclosure.

The progress presentation processing illustrated in FIG. 22 in the second embodiment is characterized by that as the image recognition processing progresses, the reciprocation speed of the weight 111 is decreased to decrease the amplitude of the weight 111. However, progress presentation processing illustrated in FIG. 25 is characterized by that while keeping the reciprocating speed of the weight 111 constant, as the image recognition processing progresses, the weight 111 is moved to right or left from the central position for a shorter time, to decrease the amplitude of the weight 111.

As illustrated in FIG. 25, first, the main control unit 202 prepares a required time T1 taken for the weight 111 to move from the center to the end, setting time T, elapsed time t, and three parameters of the moving direction F (S2401).

Referring to FIG. 24, as in S2202 (FIG. 23), the required time T1 is time taken when the weight 111 moves from the center "0" (the central position in the lateral direction) to the end "R" or "−R" of the moving range 2R at the predetermined speed V0, and is stored in the memory 213 in advance. In processing in S2401, the main control unit 202 reads the required time T1 from the memory 213. The setting time T is the parameter that indicates the time taken for the weight 111 to move to right or left from the center "0" in the moving range 2R. The main control unit 202 sets the required time T1 as an initial value of the setting time T. The elapsed time t is the parameter that indicates the time elapsed when the weight 111 starts to move from the center "0" of the moving range 2R. The moving direction F is as described in the modification example 1 and thus, description thereof is omitted.

Next, the main control unit 202 sets the elapsed time t to "0" to initialize the elapsed time t and then, transmits a command to designate the setting time T, the elapsed time t, and the moving direction F to the first drive mechanism control unit 212 (S2402).

Next, the first drive mechanism control unit 212 accepts the command to designate the setting time T, the elapsed time t, and the moving direction F from the main control unit 202, returns the weight 111 to the central position in the lateral direction (the center "0" of the moving range 2R) and then, moves the weight 111 in the moving direction F at the predetermined speed V0 (S2403).

Specifically, if the elapsed time t is less than the setting time T in Step S2403 (NO in S2404), the first drive mechanism control unit 212 returns the processing to S2403, and executes processing in S2403 and subsequent steps. In this manner, until the setting time T elapses from start of movement of the weight 111, the first drive mechanism control unit 212 moves the weight 111 from the central position in the lateral direction in the moving direction F.

If the elapsed time t reaches the setting time T (YES in S2404), the main control unit 202 sets the moving direction F to −F", and transmits a command to designate the set moving direction F to the first drive mechanism control unit 212 (S2405). For example, in processing in S2405, the main control unit 202 sets the moving direction F to "−1" when the moving direction F of the weight 111 is "1", and to "1" when the moving direction F of the weight 111 is "−1". Thereby, the main control unit 202 reverses the moving direction of the weight 111.

Then, when the weight 111 returns to the central position in the lateral direction (YES in S2406), if the communication unit 220 receives the image recognition result from the cloud server 3 (YES in S2407), the main control unit 202 finishes the progress presentation processing. In S2406, when the rotation count acquired from the built-in encoder not illustrated corresponds to the rotation count at which the weight 111 is located at the central position in the lateral direction, the main control unit 202 may determine that the weight 111 returns to the central position in the lateral direction. As described above, when the weight 111 returns to the central position in the lateral direction, if the communication unit 220 receives the image recognition result, the control circuit 201 finishes the progress presentation processing. This can prevent the robot 1 from unnaturally responding while swinging side-to-side.

When the weight 111 returns to the central position in the lateral direction (YES in S2406), if the communication unit 220 does not receive the image recognition result from the cloud server 3 (NO in S2407) as well as the notification that image recognition processing is partially finished (NO in S2408), the main control unit 202 returns the processing to S2402. In this manner, when the weight 111 returns to the central position in the lateral direction, if the communication unit 220 does not receive the image recognition result, the main control unit 202 continues to reciprocate the weight 111 from the central position in the lateral direction. As a result, until the image recognition result is received, the robot 1 can repeatedly swing side-to-side to notify the user that the image recognition processing is being executed.

When the weight 111 returns to the central position in the lateral direction (YES in S2406), if the communication unit 220 does not receive the image recognition result from the cloud server 3 (NO in S2207), and the notification that image recognition processing is partially finished is received (YES in S2408), the main control unit 202 proceeds the processing to S2409. In S2408, the robot 1 receives the processed stage number N and the number of stages M.

In S2409, using the processed stage number N and the number of stages M that are received in S2408, the main control unit 202 sets the setting time T to T1×(1−N/M)" to decrease the setting time T. For example, when the stage "1" is finished, the robot 1 receives N=1 in S2408. Accordingly, during the processing of the stage "2", the setting time T is set to T1×(1−1/M).

In this manner, each time the image recognition processing progresses by one stage, the main control unit 202 decreases the setting time T by one step. Thereby, the main control unit 202 decreases the amplitude of the weight 111, which is a distance by which the weight 111 reciprocates from the central position. The distance is expressed as a product TV0 of the setting time T and the predetermined speed V0.

In the example illustrated in FIG. 21, during the processing of the stage "1", the main control unit 202 sets the setting time T to the required time T1. The required time T1 is assumed to be the time taken when the weight 111 moves from the center "0" of the moving range 2R to the end "R" or "−R" of the moving range 2R. In this case, since the weight 111 reciprocates side-to-side with the amplitude "R" corresponding to "T1×V0", the robot 1 also swings side-to-side with the amplitude "R".

When the processing in the stage "1" is finished, the main control unit 202 sets the setting time T to "T1×2/3 (=1−1/3)". Accordingly, during the processing of the stage "2", the weight 111 reciprocates side-to-side with the amplitude "R×2/3" corresponding to "T1×2/3×V0", and the robot 1 also swings side-to-side with the amplitude "R×2/3".

When the processing in the stage "2" is finished, the main control unit 202 sets the setting time T to "T1×1/3 (=1−2/3)". Accordingly, during the processing of the stage "3", the weight 111 reciprocates side-to-side with the amplitude "R×1/3" corresponding to "T1×1/3×V0", and the robot 1 also swings side-to-side with the amplitude "R×1/3".

As described above, in this embodiment, as the stage of the image recognition processing progresses, the amplitude of the weight 111, that is, the distance by which the weight 111 moves from the central position in the lateral direction is decreased. Therefore, the progress of the image recognition processing can be informed to the user through the motion of the robot 1.

Modification Example 3

In first and the second embodiments, when the image recognition processing is requested to the cloud server 3, the robot 1 swings side-to-side. The present disclosure is not limited to this, when processing (for example, voice recognition processing) other than the image recognition processing is requested to the cloud server 3, the robot 1 may swing side-to-side. Also in a case where processing other than the image recognition processing is requested to the cloud server 3, it may take a predetermined time or more to acquire a processing result. In this case, the robot 1 can be set to swing side-to-side until the processing result is acquired, thereby preventing the user from wrongly determining that the robot 1 is out of order.

Modification Example 4

Although the display unit 206 is provided in first and the second embodiments, it is an only example and the display unit 206 may be omitted. Since the display unit 206 displays the portions of the face of the robot, the robot 1 including the display unit 205 can provide better expression indicating that the robot 1 is thinking. However, even the robot 1 not including the display unit 206 can notify the user that the robot 1 is thinking, to a sufficient degree by swinging side-to-side until the processing result is acquired,.

Modification Example 5

In the second embodiment, as the stage of the image recognition processing progresses, the current reciprocation speed V is decreased by "N/M". It is merely an example, and as the stage progresses, the current reciprocation speed V may be decreased such that the decrease gradually becomes smaller or larger. Similarly, in the modification example of the second embodiment, as the stage of the image recognition processing progresses, the setting time T may be decreased such that the decrease gradually becomes smaller or larger.

(Overview of Embodiment of the Present Disclosure)

A robot according to an aspect of the present disclosure is a robot including:

a main housing in a spherical zone shape of a sphere from which a first side portion and a second side portion opposed to the first side portion are cut off;

a first spherical cap portion corresponding to the spherical first side portion;

a second spherical cap portion corresponding to the spherical second side portion;

an input device provided in any of the main housing, the first spherical cap portion, and the second spherical cap portion;

an output device provided in any of the main housing, the first spherical cap portion, and the second spherical cap portion;

a shaft that is provided in the main housing, and that couples the first spherical cap portion and the second spherical cap portion;

a weight that is provided in the main housing and that rotates around a pivot being orthogonal to the shaft;

a first drive mechanism that rotates the pivot of the weight;

a second drive mechanism that rotates the main housing around the shaft; and a control circuit that, when a response to an input instruction inputted by a user via the input device is to be made via the output device based on predetermined processing that requires a predetermined time or more, controls the first drive mechanism during the predetermined processing such that the first drive mechanism rotates the pivot of the weight to reciprocate the weight.

The robot according to the aspect controls the first drive mechanism during the predetermined processing such that the first drive mechanism rotates the pivot of the weight to reciprocate the weight when the response to the input instruction inputted by the user via the input device is to be made via the output device based on the predetermined processing that requires the predetermined time or more.

With this configuration, when the robot needs the predetermined time for response to the users question or more, the robot swings side-to-side facing forward in direction along the pivot of the weight. The swinging motion implies the state the robot is shaking its body side-to-side while thinking deeply, for example.

Accordingly, even the spherical robot including no hand or leg, and having the constraints in notifying the user of the progress state in internal processing can notify the user that the robot is under processing during the dialogue with the user by utilizing the movement of the weight without displaying the indication of the in-process state on the surface of the spherical robot. Consequently, just by viewing the external appearance of the robot, the user can determine whether the robot is under processing or out of order.

Preferably, in the aspect, the main housing in the spherical zone shape, the first spherical cap portion, and the second spherical cap portion constitute the sphere.

In the aspect, since the main housing in the spherical zone shape, the first spherical cap portion, and the second spherical cap portion form the sphere, the second drive mechanism can rotate the main housing to move the robot forward and backward such that the sphere is rolling.

Preferably, in the aspect,
when causing the output device to output a content of the response, the control circuit stops reciprocation of the weight at a default position of the weight.

In the aspect, when the output device outputs contents of the response, reciprocation of the weight is stopped at the default position of the weight. Thus, even in the case the robot attempts to swing side-to-side as if it is thinking deeply during the predetermined processing, when the output device outputs contents of the response, the robot returns to the default position and answers to the user's question. This can prevent the robot from unnaturally swinging side-to-side during the response due to the predetermined processing.

Preferably, in the aspect,
the predetermined processing includes two or more steps, and
each time one of the two or more steps is finished, the control circuit decreases a speed at which the weight reciprocates.

In the aspect, since the speed at which the weight reciprocates is decreased as the predetermined processing progresses, the user can be notified of the progress of the predetermined processing through the motion of the robot.

Preferably, in the aspect,
the predetermined processing includes two or more steps, and
each time one of the two or more steps is finished, the control circuit decreases a distance by which the weight reciprocates from a default position.

In the aspect, since the distance by which the weight moves from the default position is decreased as the predetermined processing progresses, the user can be notified of the progress of the predetermined processing through the motion of the robot.

Preferably, in the aspect, the robot further includes
an arm extending from the shaft in a direction orthogonal to the shaft; and
a display unit that is provided in the arm, and that displays at least a portion of a face of the robot.

In this case, a portion of the face of the robot, which is displayed on the display unit, constitutes a mouth, a nose, or the like. When the robot needs the predetermined time for response to the users question or more, for example, the robot swings side-to-side with the mouth or nose facing forward. The swinging motion implies the state the robot is shaking its body side-to-side while thinking deeply.

Thus, during a dialogue with the user, the robot can notify the user that the robot is under processing, by utilizing the movement of the weight. As a result, based on only the external appearance of the robot, the user can determine whether the robot is under processing or the robot is out of order.

Preferably, in the aspect, the robot further includes
a camera provided in at least one of the first spherical cap portion and the second spherical cap portion such that an imaging direction matches an advancing direction by the second drive mechanism; and
a communication circuit provided in the main housing, and connected to an external network, in which
the predetermined processing is image recognition processing executed in an external server connected via the external network.

The image recognition processing has excessive loads and thus, is often executed in an external server. In this case, it takes a predetermined time or more to acquire a processing result. In the aspect, also when the predetermined processing is executed in the external server, the robot swings side-to-side until the processing result is acquired. Therefore, the robot can notify the user that internal processing is being executed.

Preferably, in the aspect,
when the response is to be made based on the image recognition processing, the control circuit performs control such that:
the camera takes an image recognition target object;
the communication circuit transmits the taken image of the recognition target object to the external server via the external network;
the communication circuit receives a recognition result of the image of the recognition target object from the external server; and
the output device outputs the received recognition result.

In the aspect, since the image recognition processing having excessive loads is executed in the external server, the robot only needs to take an image of the recognition target object and receive the recognition result from external server, reducing its loads.

Preferably, in the aspect,
the input device is a microphone, and
the input instruction inputted by the user via the input device is a voice instruction.

In the aspect, the user can instruct the robot to execute the predetermined processing by voice without any manual input. This reduces the user's burden of manually inputting the instruction. It is advantageous especially for little children who are incapable of manually inputting an instruction.

Preferably, in the aspect,
the output device is a speaker.

In the aspect, since the processing result is output via the speaker, the user can know the processing result even when the user does not watch the robot closely.

Advantageously, the robot according to the exemplary embodiment of the present disclosure can notify the user of the progress of internal processing.

What is claimed is:
1. A robot comprising:
a spherical housing including a main housing portion, a first spherical cap portion, and a second spherical cap portion,
wherein the main housing portion is disposed between the first spherical cap portion and the second spherical cap portion;
an input device provided in the spherical housing;
an output device provided in the spherical housing;
a shaft that is provided in the main housing portion, and that couples the first spherical cap portion and the second spherical cap portion;
a weight that is provided in the main housing portion and configured to rotate around a pivot that is orthogonal to the shaft to reciprocally move the weight in opposite directions of the pivot;
an arm extending from the shaft in a direction orthogonal to the shaft;
a display that is provided on the arm, and configured to display at least a portion of an image of a face of the robot;
a first drive mechanism that rotates the pivot of the weight;
a second drive mechanism that rotates the main housing portion around the shaft; and
a control circuit that, when outputting, via the output device, a response to an input instruction received from a user, via the input device, based on a predetermined processing is determined to require a predetermined time or more, controls the first drive mechanism during the predetermined processing such that the first drive mechanism rotates the weight around the pivot to reciprocally move the weight in the opposite directions of the pivot.

2. The robot according to claim 1, wherein when causing the output device to output content of the response, the control circuit stops the reciprocal movement of the weight at a default position of the weight.

3. The robot according to claim 1, wherein the predetermined processing includes two or more procedures, and the control circuit decreases a speed at which the weight moves reciprocally, each time each of the two or more procedures ends.

4. The robot according to claim 1, wherein the predetermined processing includes two or more procedures, and the control circuit decreases a distance by which the weight moves reciprocally from a default position.

5. The robot according to claim 1, further comprising a camera provided in the spherical housing; and a communication circuit provided in the main housing portion, and configured to connect to a network, wherein the predetermined processing is an image recognition processing executed in an external server connected via the network.

6. The robot according to claim 5, wherein when the response is to be made based on the image recognition processing, the control circuit performs control such that:

the camera captures an image of a target object;

the communication circuit transmits, to the external server via the network, the captured image of the target object;

the communication circuit receives, from the external server, a recognition result of the image of the target object; and the output device outputs the received recognition result.

7. The robot according to claim 1, wherein the input device is a microphone, and the input instruction inputted by the user via the input device is a voice instruction.

8. The robot according to claim 1, wherein the output device is a speaker.

9. The robot according to claim 1, wherein the second drive mechanism rotates the main housing portion around the shaft to drive the main housing portion in an advancing direction.

10. The robot according to claim 5, wherein the camera is disposed such that an imaging direction matches an advancing direction of the main housing portion driven by the second drive mechanism.

* * * * *